US007149239B2

(12) United States Patent
Hudson

(10) Patent No.: US 7,149,239 B2
(45) Date of Patent: Dec. 12, 2006

(54) COMMUNICATION SYSTEM AND METHODS OF ESTIMATING CHANNEL IMPULSE RESPONSES THEREIN

(75) Inventor: John E Hudson, Stansted (GB)

(73) Assignee: Nortel Networks Limited, St. Laurent (CA)

( * ) Notice: Subject to any disclaimer, the term of this patent is extended or adjusted under 35 U.S.C. 154(b) by 467 days.

(21) Appl. No.: 10/109,915

(22) Filed: Mar. 29, 2002

(65) Prior Publication Data

US 2003/0043887 A1    Mar. 6, 2003

Related U.S. Application Data

(63) Continuation-in-part of application No. 09/825,058, filed on Apr. 3, 2001.

(51) Int. Cl.
H04K 1/00 (2006.01)
H04B 1/10 (2006.01)

(52) U.S. Cl. ..................... 375/144; 375/350
(58) Field of Classification Search ............... 375/144, 375/229, 347; 370/342; 455/137; 700/52
See application file for complete search history.

(56) References Cited

U.S. PATENT DOCUMENTS

| | | | | |
|---|---|---|---|---|
| 5,578,923 | A * | 11/1996 | Chen | 324/309 |
| 5,623,511 | A * | 4/1997 | Bar-David et al. | 375/143 |
| 6,121,927 | A * | 9/2000 | Kalliojarvi | 342/453 |
| 6,141,393 | A * | 10/2000 | Thomas et al. | 375/347 |
| 6,154,486 | A * | 11/2000 | Scott et al. | 375/142 |
| 6,229,842 | B1 * | 5/2001 | Schulist et al. | 375/148 |
| 6,233,273 | B1 * | 5/2001 | Webster et al. | 375/148 |
| 6,289,062 | B1 * | 9/2001 | Wang et al. | 375/346 |
| 6,370,183 | B1 * | 4/2002 | Newson et al. | 375/144 |
| 6,421,334 | B1 * | 7/2002 | Baines | 370/342 |

(Continued)

OTHER PUBLICATIONS

Li et al., Channel Estimation for OFDM Systems with Transmitter Diversity in Mobile Wireless Channels, Mar. 1999, IEEE Journal on Selected Areas in Communications, vol: 13, Issue 3, pp. 461-471.*

(Continued)

*Primary Examiner*—Emmanuel Bayard
*Assistant Examiner*—Lawrence B. Williams
(74) *Attorney, Agent, or Firm*—Barnes & ThornburgLLP

(57) ABSTRACT

Multiple Steiner codes are transmitted as bursts from multiple base stations (182, 184, 186) having one or more transmit elements (174, 176, 178, 180), with successive bursts providing an extended training sequence for use in channel estimation at an addressed unit (172), such as a mobile handset. Accurate channel estimation is possible through the use of Wiener frequency domain MMSE deconvolution (518) combined with frequency domain spatial decoupling matrices, with quasi-orthogonal pseudo-noise sequences (502, 504, 520, 522) allocated to base stations and their antenna elements. The use of Steiner codes to supplement Wiener frequency domain MMSE deconvolution and frequency domain spatial decoupling results in the possibility of allocating only a single training sequence to each base station provided that the training sequence is of sufficient length to encompass all multiple time-translated channel impulse responses (H). Estimates may be refined iteratively by minimising the MS error of demodulated pilot symbols. Estimates may also be refined by removing taps from the impulse response which are insignificant based on a relatively long-term power-delay profile for the channel.

52 Claims, 8 Drawing Sheets

U.S. PATENT DOCUMENTS

| | | | |
|---|---|---|---|
| 6,515,978 B1* | 2/2003 | Buehrer et al. | 370/342 |
| 6,614,836 B1* | 9/2003 | Halford et al. | 375/152 |
| 6,618,452 B1* | 9/2003 | Huber et al. | 375/343 |
| 6,661,857 B1* | 12/2003 | Webster et al. | 375/350 |
| 6,680,967 B1* | 1/2004 | Westman | 375/148 |
| 6,765,894 B1* | 7/2004 | Hayashi | 370/335 |
| 6,765,969 B1* | 7/2004 | Vook et al. | 375/259 |
| 6,778,592 B1* | 8/2004 | Haga et al. | 375/148 |
| 6,850,505 B1* | 2/2005 | Ostberg | 370/335 |
| 6,990,345 B1* | 1/2006 | Kuwahara et al. | 455/440 |
| 2001/0014116 A1* | 8/2001 | Saito et al. | 375/148 |
| 2002/0041635 A1* | 4/2002 | Ma et al. | 375/267 |
| 2002/0150176 A1 | 10/2002 | Chevalier et al. | |

OTHER PUBLICATIONS

Clark, M. V., Adaptive Frequency-Domain Equalization and Diversity Combining for Broadband Wireless Communications, May 18-21, 1998, Vehicular Technology conference, 1998. 48$^{th}$ IEEE, vol. 1, pp. 409-413.*

Jeon et al., An Efficient Channel Estimation Technique for Technique for OFDM systems With Transmitter Diversity, Sep. 18-21, 2000, Personal, Indoor and Mobile Radio Communications, 2000, PIMRC 2000, vol. 2, pp. 1246-1250.*

* cited by examiner

COMMUNICATION SYSTEM AND METHODS OF ESTIMATING CHANNEL IMPULSE RESPONSES THEREIN

CROSS REFERENCE TO RELATED APPLICATION

This application is a continuation-in-part application of application Ser. No. 09/825,058 filed on 3 Apr. 2001.

FIELD OF THE INVENTION

This invention relates, in general, to a communication system and a method of estimating channel impulse response (IR) therein, and is particularly, but not exclusively, applicable to communication environments employing space-time coding. The present invention is also applicable, without imposing limitation, to code division multiple access (CDMA) schemes, orthogonal frequency division multiplexing (OFDM) or the global system for mobile (GSM) communication, and also to systems having base stations configured to transmit on either a time-aligned or unsynchronised basis.

BACKGROUND OF THE INVENTION

GSM, CDMA, and OFDM systems and those systems using space-time coding usually require estimation of impulse responses (IR's) between a terminal antenna and several base antennas, especially in instances when the relative signal strengths of the base stations are similar. As will be understood, the physical channel through which propagation occurs can have a severely detrimental effect on the ability to recover data accurately, especially with increasing data rates. Consequently, by knowing the IR, compensation for channel-induced defects can be applied to improve accuracy in data recovery, e.g. through interference cancellation techniques. More especially, with multiple transmit elements at a base station, irrespective of whether there is more than one serving base station, multipath interference results in an inability to resolve individual channels. Indeed, even orthogonally structured data (such as different and time dispersed training sequences) can become cross-correlated (in the face of multipath interference) and hence unusable to resolve individual channels/paths in the context of a deterministic IR approach. Furthermore, it will be appreciated that IR determination is particularly taxing at a handoff point at cell boundaries of, potentially, two or three serving base stations (or Node Bs in the context of CDMA and the Universal Mobile Telecommunications System (UMTS)). At cell-boundary handover, the issue of IR is complicated by the fact that downlink carrier to interference ratios (CIRs) can be zero or negative.

When available, impulse responses can also be used to assist in downlink soft-handover.

The use of matched filtering of standard training sequences to determine channel IR's is considered adequate to drive fingers of a RAKE filter in CDMA applications, such as IS-95 and CDMA2000, given that incoherent soft handoff is also allowed. However, more recent cellular system proposals will stretch matched filtering techniques to their limits and beyond due to the use of higher data throughputs (with more bits per symbol, e.g. higher quadrature amplitude modulation QAM levels) requiring higher energy per bit/noise floor ($E_b/N_o$) than existing systems, such as IS-95. Such higher data rate cellular systems include the Enhanced Data-rate for GSM Evolution (EDGE) system and multiple-input-multiple-output (MIMO) methods (using multiple transmit and receive antennas) applied to High Speed Downlink Packet Access (HSDPA) standards. MIMO methods potentially may also be applied to UTRA TDD, CDMA2000 and even GSM-EDGE.

In any event, interference cancellation, coherent soft hand-off or space-time coding generally requires a more accurate estimate of channel propagation conditions (than that required with RAKE filtering or matched filtering). In this respect, a long history of interference cancelling base station algorithms (that yield indifferent null-steering performance) lends support to this view.

In terms of proposed 3G (third generation) cellular systems, it is known to use training sequences with a cyclic prefix for pilot tones in orthogonal frequency division multiplexing (OFDM) and CDMA. When a channel has an impulse response of known maximum duration, the use of Steiner codes allows re-use of the same training sequence with a time-offset method to measure simultaneously the channel impulse responses of several users or several antenna with a single fast Fourier transform (FFT) operation Steiner codes are discussed in the paper "A comparison of uplink channel estimation techniques for MC/JD-CDMA transmission systems" by B. Steiner and R. Valentin, Proceedings IEEE 5th International Symposium on Spread Spectrum Techniques and Applications 1998, Volume: 2, pp. 640–646. Indeed, cyclic Steiner codes are found in the pilot tones for the time division duplex (TDD) component of European UMTS, as presented in the ETSI 3GPP Document TS25.211 "Transport channels and physical channels" v.3.2.0, 1999. In terms of a frame structure for a pilot tone, random data sectors sandwich an observation window that is preceded by a cyclic prefix of a latter portion of the observation window. Provided that the duration of the cyclic prefix exceeds the channel impulse response, then data in the observation window is a function purely of the pilot sequence (comprised from the combination of the cyclic prefix and data in the observation window) and is not corrupted by spurious unknown data in any way.

The 3G Partnership Project (3GPP) have defined training sequences for TDD time division duplex) having overall chip lengths of 256 and 512 chips; the overall lengths are derived from 192 chips and 456 chips of basic pseudo-random number sequence codes with, respectively, an additional cyclic prefix of either 64 chips and 56 chips. Each training sequences is designed to allow channel impulse response estimation for differing numbers of users, namely three users in the case of the 256-chip training sequence and eight users in the case of the 512-chip training sequence.

The training sequences are utilised in the receiving unit to estimate the channel impulse response based on a complex cross-correlation (in real and imaginary phase and amplitude components) between received chips and a local replica of the training sequence. In this regard, it is usual, on a per channel basis, to take a correlation of the channel impulse response (h) with the sequence (s) from the transmitter. More particularly, from a single base station having multiple transmit elements, cyclic offsetting of Steiner codes allows utilisation of a fast Fourier transform (FFT) technique to solve individual channel impulse responses. Steiner cyclic pilot codes can therefore be used in estimating, with a single correlator, channel impulse responses of multiple users that do not mutually interfere. Steiner codes may be Gold codes.

As will be understood, the requirement for cyclic redundancy to mitigate data corruption caused by multipath may be obviated provided that the length of the transmitted training sequence (or pilot tone) is sufficiently long. In generality, cyclic redundancy may be avoided if a training sequence contains a sufficient number of chips, with the overall length of the training sequence determined by the prevailing dispersion conditions associated with the channel. Additionally, for estimating CIR, it is also necessary to consider the physical state of the receiving unit, since the channel for a slow moving or stationary receiving unit (e.g. a handheld device) is ostensibly stable, i.e. constant.

By way of practical explanation of Steiner code operation from a dual element array of a base station transmitter, it will be appreciated that, in estimating the two channels from the two radiating elements to a single receive antenna, the two radiating elements use a common generic pseudorandom number (PN) training sequence $\{\underline{s}_1, \underline{s}_2\}$ which is end-around shifted (in this case by half a block) to $\{\underline{s}_2, \underline{s}_1\}$ for the second element. The two channel impulse responses are $\{\underline{h}_1, \underline{h}_2\}$ and the receiver antenna sees the superposition of the two convolved sequences:

$$\{y\} = \{s_1, s_2\} \otimes \{h_1\} + \{s_2, s_1\} \otimes \{h_2\}$$

where $\otimes$ means a discrete-time convolution operation. When the receiver output is correlated with the PN sequence of the first antenna, the impulse responses of the two distinct channels are recovered in superposed form with a relative time shift of half a block. If the maximum probable duration of the impulse responses is finite and known and less than half the PN code length, the two channel estimates are non-overlapping and orthogonal and can be recovered by slicing an output of a correlator block into two halves. Clearly the process extends easily to estimating M channels by splitting the generic PN sequence into M segments $\{\underline{s}_1, \underline{s}_2, \ldots \underline{s}_M\}$ where $\{\underline{s}\}$ means a short symbol sequence, and wherein transmissions from the base antenna transmit elements follow the sequences $\{\underline{s}_1, \underline{s}_2, \ldots \underline{s}_M\}$, $\{\underline{s}_M, \underline{s}_1, \ldots, \underline{s}_{M-1}\}\{\underline{s}_M, \ldots \underline{s}_{M-2}\}$.

At the receive antenna, the processing block is correlated with only the first copy, $\{s_1, s_2, \ldots s_M\}$ of the PN sequence whereupon, at the correlator output, the M different channel impulse responses separate out in time and appear in sequence. Clearly, the cyclic head is different for each downlink path, but this is purely a transmitter burden, whereas the receiver samples the waveform and continues to see the same rotated training sequence. In this way, a common discrete Fourier Transform operation can be used to resolve multiple downlink channel impulse responses.

As previously indicated, in order to avoid contamination with unknown data which usually immediately precedes the training sequence, a cyclic copy of the end of each rotated sequence may be prefixed at the start of the pilot block. In other words, when working with, say, 512-point processing blocks and when the duration of the channel impulse response is K samples, the total extent of the transmitted pilot burst is 512+K samples of which the first K contaminated samples are discarded at the receiver.

The maximum number M of channel impulse responses that can be estimated by the Steiner method is:

$$M \leq \frac{N}{K}$$

where N is the length of the training sequence (samples) and K is the maximum likely number of samples in the channel impulse response.

Unfortunately, with Steiner codes, the resolution of base stations in different cells is much less attractive. Specifically, whilst it would be possible to continue to expand the Steiner method with ever increasing numbers of built in channels M (e.g. perhaps twice or three times the number needed for one base station), estimating more channels needs longer training sequences and synchronisation of the relevant base stations. Increasing training sequence length, however, is not the main difficulty; a bigger problem is that this Steiner solution would effectively constrain all the bases to use one and the same fundamental PN sequence and this would not allow addressed units to discriminate between bases by different codes when they are searching for handoff possibilities. Steiner is also inflexible since there is contention over the order in which the bases should cycle their training sequences. This contention will appear at all six interfaces of the base's cell with other cells in a hexagonal layout and so sequence cycling must be set up to be compatible with all adjacent sites that could be affected.

As will now be appreciated, communication systems demand the resolution of multiple channels that combine to provide a composite channel impulse response C from observed training sequences S transmitted by several base stations each with multiple antenna elements. In this regard, a time domain channel estimation $h_1(t)$ for pilot sequence $s_1(t)$ convolved through channel $h(t)$ that is subject to noise $n(t)$ may be obtained through a time-reversed correlation of the received sequence with a matched filter having the form $s_1^*(-t)$. In the frequency domain, the channel estimation takes the form $\hat{H}_1(\square_k)$.

For the purposes of channel estimation, matched filtering of the PN sequence in the receiver can be performed through fast Fourier Transform (FFT) techniques. If the received data block of N samples is $\{y_1, y_2, \ldots y_N\}$ (which could be a sequence like $\{\underline{s}_1, \underline{s}_2, \ldots \underline{s}_M\}$), then FFT operation yields;

$$\{s_0, s_1 \ldots s_{N-1}\} \stackrel{FFT}{\Longrightarrow} S$$

$$\{y_0, y_1 \ldots y_{N-1}\} \stackrel{FFT}{\Longrightarrow} Y$$

In other words, matched filtering operation in the time domain is equivalent to a point-by-point multiplication in the discrete Fourier domain, namely:

$$\hat{H}_k^{(MF)} = Y_k \cdot S_k^* \quad k = 0 \ldots 2^n - 1$$

$$\hat{H}_k^{(MF)} \stackrel{IDFT}{\Longrightarrow} \{\hat{h}_0^{(MF)}, \hat{h}_1^{(MF)} \ldots \hat{h}_{N-1}^{(MF)}\}$$

with two different channel estimates contained in the semi-sequences of $\{\underline{\hat{h}}\}$, namely:

$$\{\hat{h}\}_1 = \{\hat{h}_0, \hat{h}_1 \ldots \hat{h}_{N/2-1}\}$$

$$\{\hat{h}\}_2 = \{\hat{h}_{N/2} \ldots \hat{h}_{N-1}\}$$

Of course, once in the frequency domain, sidelobes present in the frequency spectrum in a channel estimation circuit containing a matched filter may be minimised through the use of a Wiener (least squares) filter technique.

The Wiener least squares filter provides an equalisation technique that utilises a modified inverse filter that controls the white noise response of the filter, i.e. the undesired enhancement of thermal noise from the antenna. The paper "Smart Antennas for Third Generation Mobile Radio Systems" by Martin Haardt (Siemens), Stanford Colloquium on Smart Antennas", July 1999, describes channel equalisation in terms of the Wiener filtering response, and explores how two or more receiving antennas can be included in the description of the received data. A further paper by H Sari et al titled "Transmission Techniques for Digital IV Broadcasting", IEEE communications magazine 33(2) February 1995, discusses channel equalisation in the context of the Wiener filter mechanism. Space-time transmit diversity (STTD) is included in the standards for 3G cellular systems in the European UMTS Terrestrial Radio Access (UTRA) system and similar systems in the American CDMA2000 proposals. Consequently, it is important for these STUD systems to implement efficiently data recovery and equalisation algorithms. Utilisation of the Wiener filter in a communication system environment is further discussed in the Applicant's Co-pending European Patent application 01300520.2 (Applicant's reference 11872ID-Hudson) having both a priority claim to U.S. patent application Ser. No. 09/488,721 and corresponding to the continuation-in-part application (Applicant's reference 11872IDUS04I-Hudson) filed in respect thereof, all incorporated herein by reference.

Equalisers and channel whiteners are generally not well conditioned, especially if the channel has zeros or deep minima in its frequency response. The stable minimum mean square error (MMSE) Wiener filter solution for the channel is therefore:

$$\hat{H}_k^{(W)} = \frac{Y_k \cdot S_k^*}{|S_k|^2 + \sigma^2}$$

$$\hat{H}_k^{(W)} \overset{IDFT}{\Longrightarrow} \{\hat{h}_0^{(W)} \ldots \hat{h}_{N-1}^{(W)}\}$$

where $\sigma^2$ is the variance of the thermal noise level in the frequency domain. If the DFT is orthogonal, i.e. a unitary matrix operation, then this $\sigma^2$ value is the same as the time domain noise variance per sample, but most FFT algorithms apply some form of scaling for which allowance must be made.

Use of the Wiener fitter solution results in residual errors caused mainly by thermal noise in the sidelobes (and not error due to imperfections in the code sequence); this can be contrasted with PN sequence autocorrelation sidelobes experienced in a matched filter environment.

The paper by J. Blantz et al on the "Performance of a cellular hybrid C/TDMA mobile radio system applying joint detection and coherent receiver antenna diversity", IEEE J. Selected Areas in Comms. 12(4), May 1994, pp. 568–579, describes a multi-user detection algorithm. A second paper by A. Klein et al on "Zero forcing and minimum mean square error equalisation for multiuser detection in code-division multiple access channels", IEEE Trans. Veh. Tech. 45(2), May 1996, pp. 276–287, provides further context to the present invention.

In overview therefore, PN training sequences sent from multiple base stations (or Node Bs) employing one or more transmit elements are subject to multipath that results in code cross-correlation and an inability at a receiver to resolve the individual channels and establish the individual channel-specific impulse responses. More specifically, whilst time alignment of base station transmissions may produce a summation of signals at the receiver (when employing appropriate windowing on a chip-by-chip basis with respect to identifiable correlation spikes), the receiver is only able to detect a composite channel impulse response that is unlikely to reflect accurately any of the actual transmission paths. Moreover, whilst the composite channel impulse response may be sufficient in the context of soft handover (in IS-96, for example), the composite channel impulse response is generally insufficient in third generation systems, including systems offering space-time coding. Furthermore, there is a reticence shown by service providers to provide synchronicity between base station transmissions since synchronised transmissions increase infrastructure costs, such as through the necessary provision of an accurate timing reference.

SUMMARY OF THE INVENTION

According to a first aspect of the invention there is provided a method of determining channel impulse responses of a plurality of channels to a communication device, the method comprising: performing transform operations on both a replica of a signal sequence S, and a received training sequence $y_n$ by the communication device in at least one burst, the received training sequence $y_n$ being the signal sequence as received through a channel, the transform operations arranged to generate a multiplicity of signal sequence frequency bins and a multiplicity of training sequence frequency bins; performing point-by-point operations between corresponding signal sequence frequency bins and training sequence frequency bins; and concatenating the point-by-point operations associated with the channel to provide a composite frequency response for the channel, the composite frequency response allowing, in the time domain, generation of the channel impulse response for the channel.

It is preferred to use a set of matrix operations in the frequency domain to resolve channels to the communication device from multiple transmitting stations, the matrix operations providing solvable linear equations for the channel impulse response H and the signal sequence S expressible in a matrix-vector form at each frequency bin.

A minimum mean square error (MMSE) estimation technique is preferable to solve the linear equations, although other mathematical techniques are possible (as will be appreciated).

The MMSE estimation technique preferably employs a Weiner filtering operation providing:

$$\hat{H} = (S^H S + Cov(B))^{-1} S^H Y$$

where: Cov(B) is a covariance matrix of thermal noise; $S^H Y$ is a matched filter operation arranged to maximize the signal to noise ratio but not to remove mutual interference between channel estimates; and $(S^H S + Cov(B))^{-1}$ is a decoupling matrix that removes the coupling between different channels caused by any non-ideal nature of the training sequences.

In a preferred embodiment, the number of bursts sent to the communication device from each transmitting unit in communication contact therewith is calculated as a multiplication of: a number of transmitting elements in a transmit array of a transmitting unit; and a number of transmitting units in communication contact with the communication device.

In a second aspect of the present invention there is provided a method of determining channel impulse responses of channels incident to a communication device, the method comprising: and transmitting multiple quasi-orthogonal pseudo-noise sequences as bursts from multiple base stations each having at least one transmit element, successive bursts providing an extended training sequence for use in channel estimation at the communication device;

applying a Wiener frequency domain MMSE deconvolution with frequency domain spatial decoupling matrices to generate channel impulse response estimates for the channels.

In another aspect of the present invention there is provided a method of determining channel impulse responses of a plurality of channels established between a plurality of transmitting elements and a communication device in a communication system, the method comprising: substantially simultaneously transmitting different training bursts from each of the plurality of transmitting elements, each burst having a length at least as long as a maximum channel duration in the communication system multiplied by a number corresponding to the plurality of transmitting elements; recovering at the communication device a signal sequence $y_n$ from the different training bursts $s_n$; and resolving the plurality of channels to recover associated channel impulse responses H for each channel by solving an algebraic matrix operation expressed in matrix-vector form as Y=SH, where; S is a matrix of partial training bursts for each channel, each training burst segmented into N pieces in the time domain; Y is a vector of a received signal sequence; and H is a concatenation of different channel impulse response vectors.

A further aspect of the present invention provides a computer program product for a processor within a receiver device, the computer program product comprising: code that performs transform operations on both a replica of a signal sequence $s_n$ and a received training sequence $y_n$ received by the communication device in at least one burst, the received training sequence $y_n$ being the signal sequence as received through a channel, the transform operations arranged to generate a multiplicity of signal sequence frequency bins and a multiplicity of training sequence frequency bins; code that performs point-by-point operations between corresponding signal sequence frequency bins and training sequence frequency bins; and code that concatenates the point-by-point operations associated with the channel to provide a composite frequency response for the channel, the composite frequency response allowing, in the time domain, generation of the channel impulse response for the channel; wherein the codes reside in a computer readable medium.

According to another aspect of the present invention there is provided a communication device having a receiver coupled, in use, to receive a plurality of channels supporting a signal sequence $y_n$ and training sequence bursts, the communication device having: a signal processing platform to perform transform operations on both a replica of a signal sequence $s_n$ and a received training sequence $y_n$ received by the communication device in at least one burst, the received training sequence $y_n$ being the signal sequence as received through a channel, the transform operations arranged to generate a multiplicity of signal sequence frequency bins and a multiplicity of training sequence frequency bins; the signal processing platform arranged to perform point-by-point operations between corresponding signal sequence frequency bins and training sequence frequency bins; and the signal processing platform further arranged to concatenate the point-by-point operations associated with the channel to provide a composite frequency response for the channel, the composite frequency response allowing, in the time domain, generation of the channel impulse response for the channel.

Yet another aspect of the present invention provides a communication receiver comprising: means for receiving, in use, multiple quasi-orthogonal pseudo-noise sequences as bursts from multiple base stations each having at least one transmit element, successive bursts providing an extended training sequence for use in channel estimation at the communication receiver; and means for applying a Wiener frequency domain MMSE deconvolution with frequency domain spatial decoupling matrices to generate channel impulse response estimates for the channels.

In one aspect of the present invention there is provided a communication device operational to receive a plurality of training sequences on a plurality of channels and a signal sequence $y_n$, the communication device comprising; a receiver for substantially simultaneously receiving, in use, different training bursts from each of the plurality of channels emanating from a plurality of transmit elements, each burst having a length at least as long as a maximum channel duration multiplied by a number corresponding to the plurality of transmit elements; recovery circuitry for recovering, in use, the signal sequence $y_n$ and the different training bursts $s_n$; and a processor arranged to resolve the plurality of channels to recover associated channel impulse responses H for each channel by solving an algebraic matrix operation expressed in matrix-vector form as Y=SH, where: S is a matrix of partial training bursts for each channel, each training burst segmented into N pieces in the time domain; Y is a vector of a received signal sequence; and H is a concatenation of different channel impulse response vectors.

According to the present invention, a base station of a communication system may be provided in which base station a transmitter chain is arranged to transmit multiple quasi-orthogonal pseudo-noise sequences as training bursts $s_n$ from at least one transmit element and further arranged to transmit a signal sequence $y_n$, successive training bursts providing an extended training sequence for use in channel estimation at a communication device of the communication system, the transmitter chain substantially simultaneously transmitting, in use, different training bursts from each of the at least one transmit element, each training burst having a length at least as long as a maximum channel duration in the communication system multiplied by a number corresponding to a plurality of channels to the communication device, the extended training sequence and the signal sequence $y_n$ providing a resolution mechanism to the communication device allowing the communication device to resolving the plurality of channels to recover associated channel impulse responses H for each channel by solving an algebraic matrix operation expressed in matrix-vector form as Y=SH, where: S is a matrix of partial training bursts for each channel, each training burst segmented into N pieces in the time domain; Y is a vector of a received signal sequence; and H is a concatenation of different channel impulse response vectors.

Advantageously, the present invention provides a mechanism for resolving a composite channel into a plurality of sub-channels with which specific individual channel impulse responses can be associated with and calculated using a numerically efficient fast transform technique. In other words, irrespective of whether or not there are synchronized base station transmission to an addressed unit from multiple base stations having one or more radiating element, individual channels can be resolved to generate channel impulse responses to aid in data recovery. Beneficially, the present invention is particularly applicable in the estimation of the channel impulse responses between multi-element base stations (in different cells) and the receive antenna array of a subscriber unit located at a 2-way or 3-way handoff point where interference is generally very high.

It can be shown that for a dispersive channel having two transmitting base stations, the present invention provides increased accuracy in channel estimation, with smaller errors experienced than in an uncoupled case. Indeed, tests have shown that normalised mobile station errors in channel estimation for the present invention can achieve results of 14.8 decibels (compared with 6.1 dB and 7.1 dB for techniques solely employing a matched filter and Weiner filter, respectively, in channel impulse response estimation). The present invention, even in conditions of varying base station transmit power, provides an improved accuracy in channel impulse response estimation, which accuracy is reflected in a general measured improvement of about 7 dB over a range of transmit signal strengths of ±20 dB for second base station (relative to a carrier signal from a first base station being set at +3 dB above thermal noise at the clip level). The present invention is therefore able to operate in interference and soft handover environments where interference becomes a problem.

A solution for estimating several downlink channels from different base antennas to a single terminal antenna by the use of multiple training bursts has been described. The method involves the use of N×N decoupling matrices in the Fourier domain to solve for N channels and gives superior results compared with attempts to use matched filters designed for added white Gaussian noise (AWGN) channels. Interference cancellation, space-time coding, and coherent soft hand-off can be enhanced by the use of the present invention.

In further aspects, the invention provides methods, apparatus or computer program products which produce a channel impulse response estimate by receiving a signal including a training sequence of predetermined training symbols, passing the received signal through a channel equaliser to substantially remove distortion of the signal caused by transmission over a channel, demodulating at least one of the training symbols, calculating the mean square error of the demodulated training symbol against a locally stored record of its known correct value, adjusting the estimated channel impulse response to substantially minimise the mean square error, and feeding the adjusted estimated channel impulse response back to the channel equaliser for use in subsequent equalisation operations whereby the channel estimates used in the channel equaliser are iteratively refined.

In yet further aspects, the invention provides methods, apparatus or computer program products which produce a channel impulse response estimate by obtaining a long-term averaged power delay profile for the channel, setting a predetermined variance threshold, estimating a channel impulse response having a plurality of taps, and removing taps from the channel impulse response estimate equivalent to those which in the long-term power delay profile, have a variance below the predetermined variance threshold.

BRIEF DESCRIPTION OF THE DRAWINGS

At least one exemplary embodiment of the present invention will now be described with reference to the following drawings, in which.

DETAILED DESCRIPTION OF A PREFERRED EMBODIMENT

Before discussing the preferred embodiment of the present invention, it should be noted that consideration has been given to employing Steiner codes in combination with Wiener MMSE estimation in the Fourier domain to obtain a low cost multi-user channel estimation method that is highly efficient for simultaneously estimating a number of channels on the downlink for CDMA systems. Steiner codes may also be used in OFDM systems though, in this case, it may be preferred to use the intrinsic OFDM symbol for training sequences. Given only prior knowledge of the maximum extent of the channel impulse response, the same basic pilot sequence can be time shifted and re-used (with properly determined cyclic headers) to function for a number of different downlink channels, and only one FFT correlation process is needed to solve for all the channels simultaneously. The technique is ideal for wideband fat pipe systems where the same user signal is radiated from different antennas of a transmit diversity antenna or a space-time coded antenna system. Channel estimation by this method is accurate enough to allow adequate interference cancellation of intercell interference, which is usually quite difficult to achieve in CDMA systems due to low grade estimates of the interference parameters.

Figure 1:
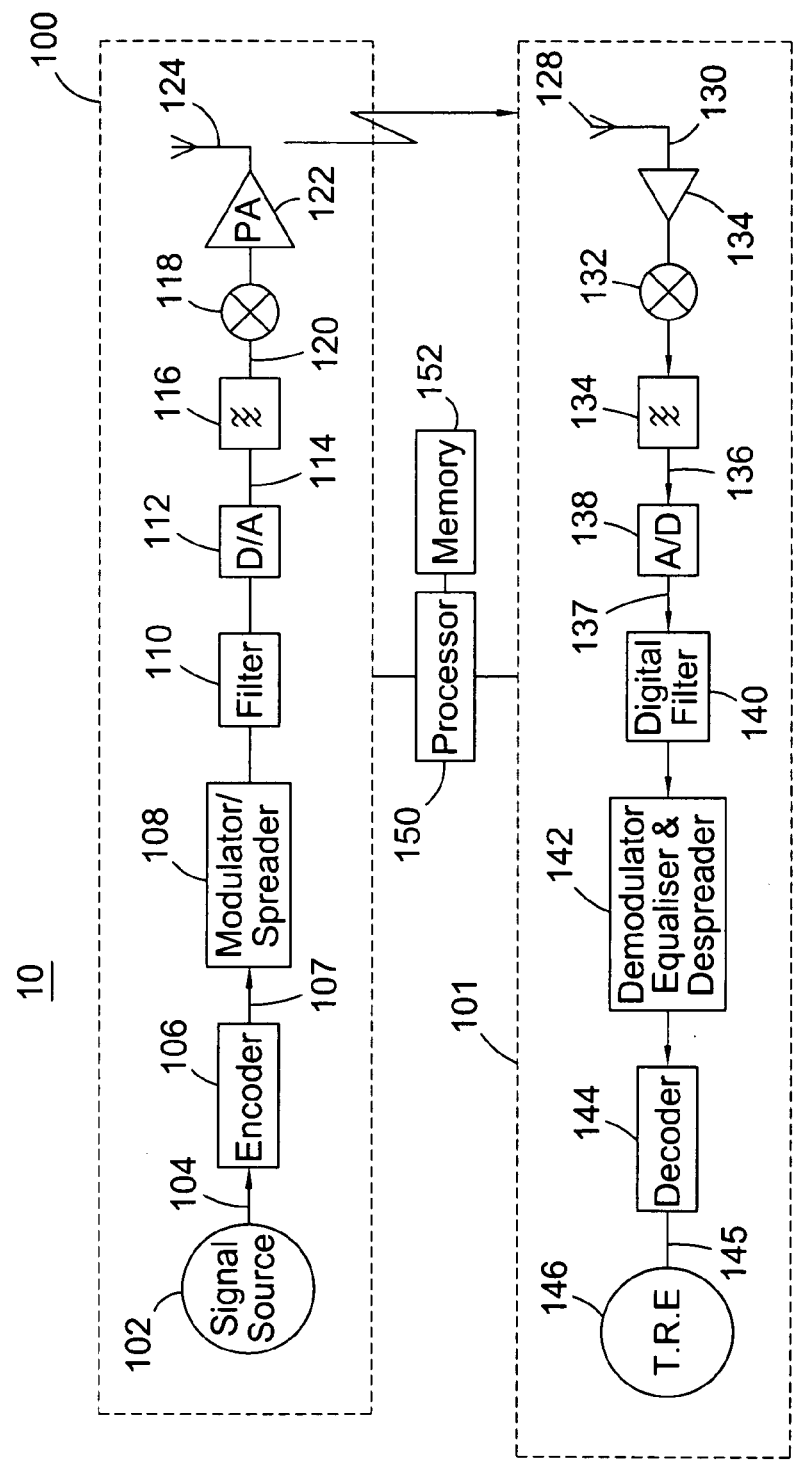
FIG. 1 is a schematic block diagram of a basic transmitter and receiver architecture 10 in which processing circuitry may be adapted to support the underlying principles of the present invention.

Referring now to FIG. 1, there is shown a basic transmitter and receiver architecture 10 in which processing logic or circuitry may be adapted to support the underlying principles of the present invention. Transmit and receive chains 100, 101 may be combined in a transceiver arrangement of a station, such as a base station/Node B or a mobile device of a cellular radio system or the like. Individual transmit and receive chains could, of course, be implemented in isolation, whereby unidirectional (as opposed to bi-directional) communication is supported across, for example, an air-interface, such as a CDMA or 3G radio environment (although the present invention is more widely applicable to multi-point transmission systems).

For the sake of explanation only, the following description of the preferred embodiment will be based on a wideband CDMA system and so references to "CDMA" should be construed broadly and without specific limitation.

In transmit chain 100, signal source 102 generates signals 104 which are encoded by encoder 106, such as a half rate turbo coder. Encoded signals 107 are modulated and subjected to CDMA spreading by modulator/spreader 108 and then filtered by pulse shaper digital filter 110. Following filtering, a digital to analogue (D/A) converter is arranged to produce analogue signals 114 which are generally filtered in a second filter 116 to limit any aliasing effect at transmission A mixer 118 up-converts baseband signals 120 to transmission frequencies prior to amplification in power amplifier 122 and transmission from antenna 124. Of course, as will be appreciated, some of the functional blocks in the transmit chain can be realised as discrete elements or collocated into a single chip or processing block.

Transmitted signals 126 are received by receive antenna 128 of an addressed station. Received signals 130 are communicated to a down-converting mixer 132 via an amplifier 134, which down-converting mixer typically produces an intermediate frequency signal for initial signal processing. A filter 134 isolates a desired frequency spectrum 136 for signal processing, which frequency spectrum is converted to a digital domain representation 137 by analogue to digital (A-D) converter 138. The digital domain representation 137 is digitally filtered in digital channel pulse shaper filter 140 and then applied in series to a combined demodulator/equaliser slicer and RAKE despreader 142 and then a channel decoder 144. Recovered information 145 is ultimately received by terminal receiving equipment (TRE) 146. It will be understood that channel filtering generally distorts the channel impulse response and the channel filter becomes part of the unknown channel.

The transmit and receive chains 100, 101 are typically micro-processor controlled operations. By way of illustration, a controller 150 and associated memory 152 (which may be a combination of random access (RAM) and read only (ROM)) is shown as being common to both the transmit and receive chains 100, 101. The memory 152 stores control algorithms, such as equalisation and modulation algorithms, an also operands and incident data is subject to signal processing requirements. Moreover, common circuitry between the transmit and receive chains can be shared to reduce component count, subject to the inclusion of suitable switching and regulating circuitry. Additionally, as will be understood, at least some of the functions within one or both of the transmit and receive chains 100, 101 can be implemented either entirely or partially as code, e.g. equalisation and demodulation. It is these code blocks, application specific integrated circuits or memory modules that can be adapted or up-graded to support the present invention.

Wideband CDMA-specific components can be replaced or substituted to support an arbitrarily selected communication protocol, e.g. an FDD environment employing TDM techniques or a multicarrier environment.

Figure 2:
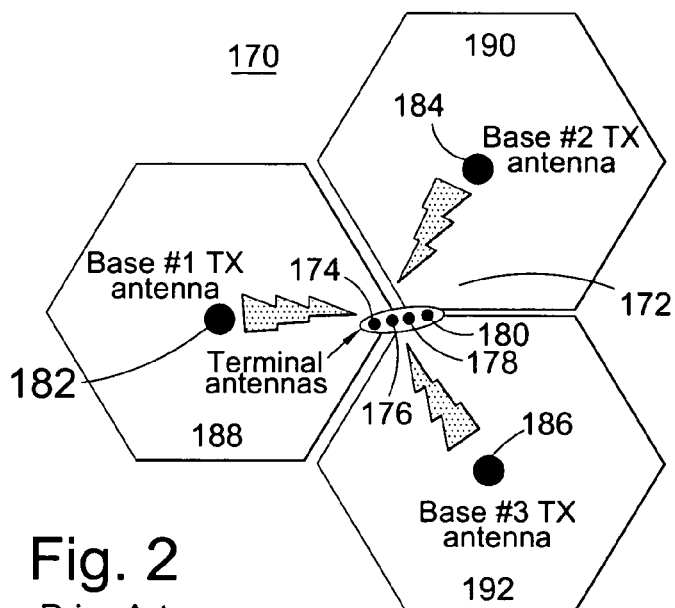
FIG. 2 is a diagrammatic illustration of a typical cellular communication system.

FIG. 2 is a diagrammatic illustration of a typical cellular communication system 170 showing a subscriber unit 172 (preferably having multiple receive elements 174–180) at cell boundaries between three potentially serving base stations 182–186. For an equidistant displacement of the subscriber unit from the base stations, one could expect that transmit signal strengths will be roughly equal, subject to the respective paths and the associated physical environments. The general purpose of FIG. 2 is to illustrate a physical environment in which the present invention finds exemplary application. For purposes of clarity, the cellular communication system 170 is shown with three cells 188–192 and a single subscriber unit 172, but clearly cellular systems may include many cells in multiple layers, with each cell servicing a multiplicity of subscriber units. At the hand-off point midway between two or three base stations, it is necessary to distinguish the channel impulse responses for a doubled or tripled number of channels from multiple base antenna elements. If the CIRs are not estimated jointly, the carrier to interference (C:I) ratio is very low within the training sequences and the channel estimates will be correspondingly poor. Given that each base station always has several TX element channels to estimate it is reasonable to use the Steiner method in the intracell mode, allocating one PN sequence per base station with cyclic rotation to distinguish between the bases' antenna elements, as described previously.

Incoming signals 126 to the subscriber unit 172 are received from the antenna 128 at a transmission rate of $1/T_{ch}$ of the system. By way of practical implementation, an entire slot of a frame is sampled (A/D converted) at the Nyquist rate and read into memory 152 (of FIG. 1) prior to commencement of information recovery. The incoming signals 126 can be received from any digital source of signals and are not restricted to wireless communications, with the base stations utilising single or multiple radiating elements in each transmit antenna array. Signal processing of incoming signals 126 for optimised data recovery is clearly subject to knowledge of the channel impulse response (i.e. the "channel spectrum"), with this determined from training sequences sent from the base stations according to a predetermined regime, e.g. once per slot, once per frame or on any other appropriate basis. An exemplary mechanism for data recovery is described in the aforementioned European and U.S. patent applications (e.g. EP 01300520.2).

Figure 3:
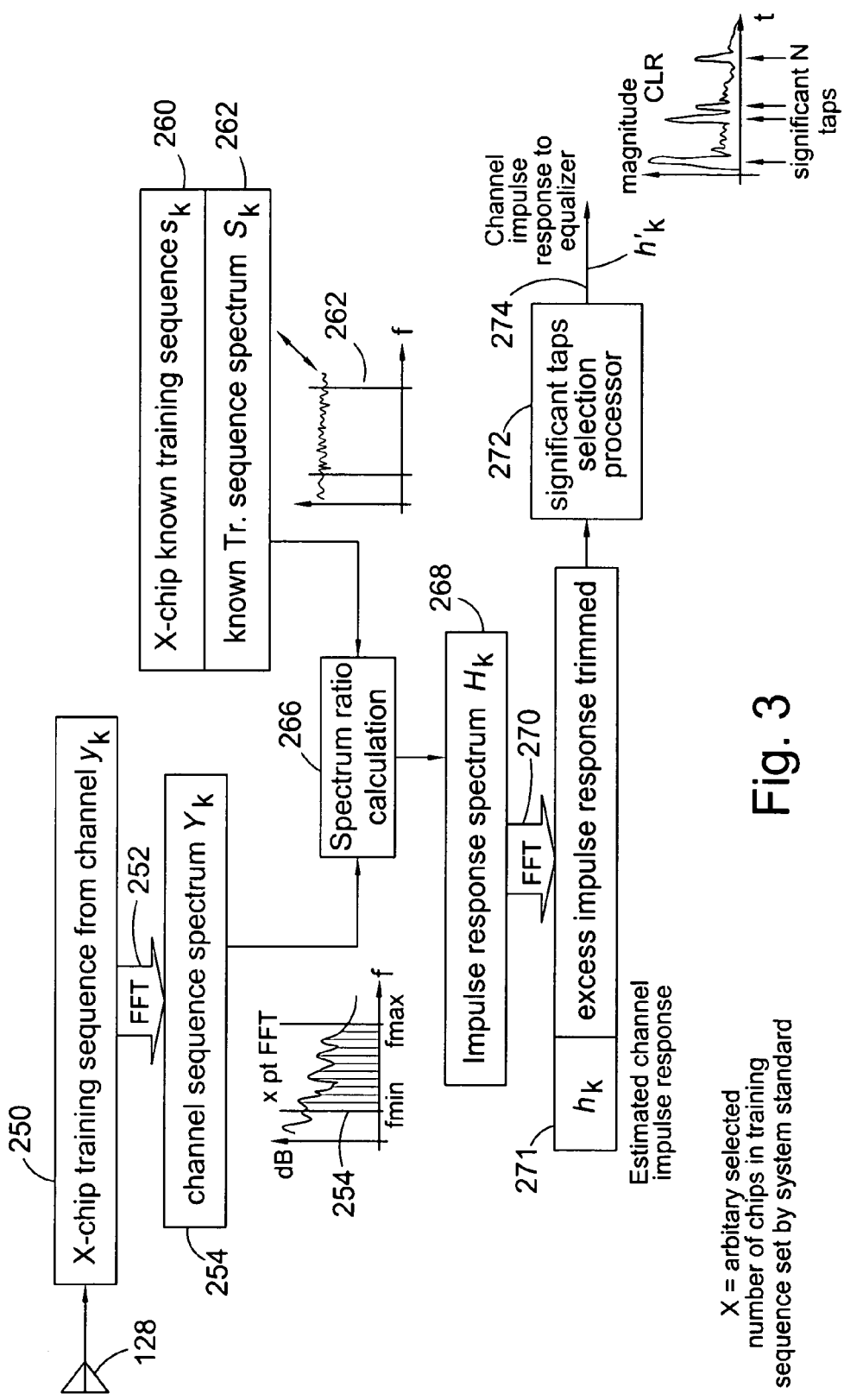
FIG. 3 shows a mechanism and schematic block diagram for channel impulse response estimation that may be adapted to support the principles of the preferred embodiments of the present invention.

As regards the channel spectrum, reference is made to FIG. 3 that shows a mechanism for channel impulse response estimation that is adapted to support the principles of the preferred embodiment of the present invention. A training sequence 250, preferably located in and extractable from each slot of a frame, falls incident on receive antenna 128, which training sequence is demodulated in the receive chain (as will be readily appreciated) to recover the random sequence $y_k$, e.g. a generated pseudo-random number sequence. The form and structure of the training sequence will be described in detail later, since the structure is associated with an ability to resolve individual channels for channel impulse response estimation according to the present invention.

In overview and without initially discussing the preferred embodiment, the recovered random sequence $y_k$ is subjected to a DFT function 252 to produce a channel sequence spectrum $Y_k$ 254. Within the memory 152 associated with the receive chain there is stored a replica of the original training sequence $s_k$ 260, which original training sequence $s_k$ 260 has a corresponding known sequence spectrum $S_k$ 262 obtained by subjecting the original training sequence $s_k$ 260 to an FFT function. The known sequence spectrum $S_k$ 262 may simply be stored in the memory since it is this sequence spectrum $S_k$ 262 that is used to assess the channel impulse response.

The DFT function 262 may be performed by a specific digital signal processor (DSP) or the processor 150 of FIG. 1. The channel spectrum therefore assumes the form of an x-point, e.g. 512-point, DFT sample stored temporarily in, for example, RAM.

It will be noted that the frequency domain sequence spectrum $S_k$ 262 is essentially flat with slight perturbations about a nominally constant magnitude.

The sequence spectrum $S_k$ 262 is compared with the channel sequence spectrum $Y_k$ 254 in a cross-correlation function 266, such as realised by a Wiener filter frequency response, namely $$W_k = \frac{H_k^*}{|H_k|^2 + \sigma^2},$$

to produce an impulse response spectrum $H_k$ 268 that can be stored in memory for the duration of at least the related slot and longer if desired. Clearly, by storing the impulse response spectrum $H_k$ 268 for an extended period, processing overhead is reduced at the expense of accuracy in any correction of the variations in the channel due to Doppler. As will be understood, time alignment of the received and transmitted training sequences is required prior to cross-correlation.

Optionally, the impulse response spectrum $H_k$ 268 may be further refined and so it is subjected to an IFFT function 270 to generate an estimated time domain representation $h_k$ thereof having an arbitrary number of taps/channels that can be used as a matched filter, if desired. In other words, each tap is representative of a weight for the channel impulse response. Within the time domain, trimming of the number of taps reduces the channel impulse response to manageable processing levels, with the reduction reflecting the greatest expected channel impulse response (CIR) duration (presently understood to be seventy-one chips in length in 3GPP, although this number is an arbitrarily selected cut-off). From the reduced number of taps in the channel impulse response, most values will approximate to zero and so a control processor 272, based on a level or number threshold, selects only those N significant taps that most noticeably reflect the channel to produce a best estimate channel impulse response $h'_k$ 274. Selection of the N most significant taps may simply force lesser taps to be forced to zero. This is explained in more detail below.

By limiting the channel impulse response to the most significant taps, processing is reduced and a final error in the channel limited. In the latter respect, it will be understood that all tap values will have an associated error from thermal noise, channel interference and other adverse channel and processing artefacts, so the compounding of errors is mitigated.

A complete understanding of the principles of the present invention will now be gleaned from the following description of specific signal processing interactions and transmission techniques.

Figure 4:
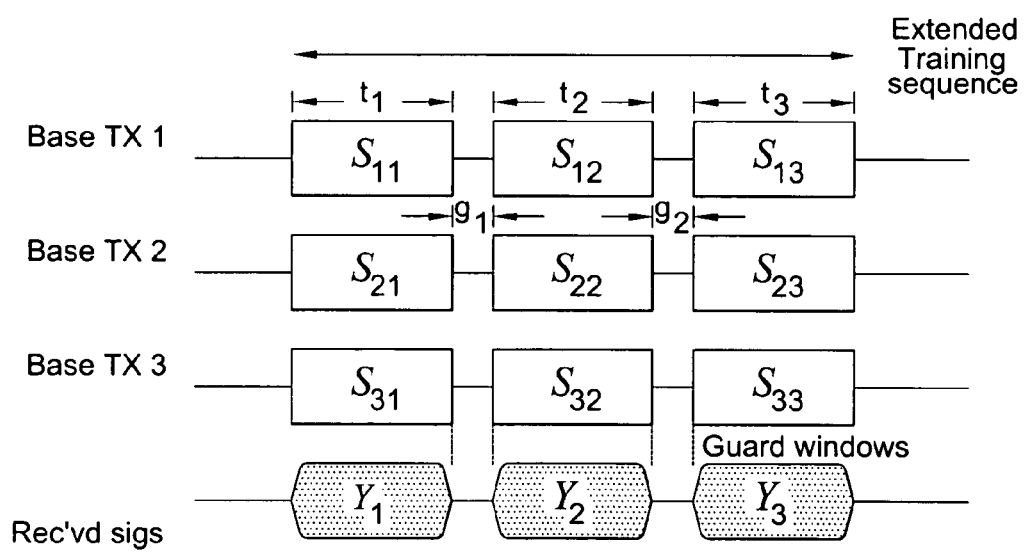
FIG. 4 is a transmission regime for a training sequence according to a preferred embodiment of the present invention.

Concerning transmission of a training sequence according to a preferred embodiment of the present invention, reference is made to FIG. 4. For the sake of explanation, the structuring of base station transmissions (in the timing frame of FIG. 4) is assumed to reflect a three site system in which each of three base stations includes a single transmit element. Of course, the basic principle employed in the specific embodiment of FIG. 4 can be developed for multi-element transmit arrays from two or more base stations and/or multiple receive antennas at a receiver. FIG. 4 is representative of successive training sequence transmission bursts from each of three base stations (Base TX1, Base TX2 and Base TX3). In generality, the number of training sequences transmitted from all transmit elements follow a squared law, i.e. for three base stations each having single radiating elements then there would be three successive bursts ($t_1$–$t_3$) separated, preferably, by guard periods ($g_1$ and $g_2$) or cyclic prefixes. Bursts from the various base stations are preferably time aligned at transmission, although a windowing function at the receiver (that steps through a chip-wise time correlation) may be employed to time align the transmitted sequences $s_{nK}$. Since channel delay is generally no greater than about 20 μs, then the receiver need only step through a chip count commensurate with the maximum channel delay. For example, at an operating frequency (chipping rate) of one megahertz (1 MHz), 20 μs correspond to twenty chips.

During each burst ($t_1$–$t_3$), each base station transmits a finite (predetermined) length of training sequence s, which training sequence may vary from 1-chip or more. Typically, each burst will be tens of chips in length and preferably at least about sixty chips in length and most preferably in excess of about one hundred chips. Clearly, the length of the training sequence is restricted to manageable levels to avoid inefficient use of communication resource for more important data transmissions. The nomenclature adopted in FIG. 4 with respect to the bursts follows the convention that the first subscript (n) represents an identity of the transmitting base station whereas the second subscript (k) represents the sequence number. In the context of Base TX1, FIG. 4 is illustrative of three sequences $s_{11}$, $s_{12}$ and $s_{13}$ during bursts $t_1$, $t_2$ and $t_3$, respectively. A channel sequence spectrum $Y_k$ is formed (for each burst ($t_1$–$t_3$)) from the summation of the individual sequences s11, $S_{21}$, $S_{31}$ from the base stations transmitting in that burst.

For channel estimation, it will be appreciated that the number of samples required is dependent upon bandwidth, e.g. with a symbol rate of 284 kbps (kilo bits per second), GSM systems require about five samples of the channel.

It is well known that DFT's have a wrap-round effect that is equivalent to the data being cyclic. Consequently, in (contiguous) observation windows each encoded with the same PN sequence, DFT's can be used to perform a discrete convolution operation. Circulant matrices are equivalent to these DFT operations, which circulant matrices can be defined as follows. In a system in which the training sequence is S={$s_0$, $s_2$, $s_3$, $s_4$}, the cyclic extension is the channel impulse response is H={$h_0$, $h_1$, $h_2$, $h_3$, $h_4$} an the observation window arranged to hold data Y={$y_0$, $y_1$, $y_2$, $y_3$, $y_4$}, then Y is the cyclic convolution of S with H:

$$y_k = \sum_{n=0}^{N} s_k h_{k-n\,MOD\,N}$$

with N=4. If the associated DFT's are the sequence spectrum $S_k$, the channel impulse response H and the channel sequence spectrum $Y_k$ is then:

$$Y_k = S_k \otimes H_k$$

where $\otimes$ is a point-by-point-product.

In developing a solution to the problem of channel estimation in the presence of interference or multi-user channel estimation (in either non-dispersive or highly dispersive channels), the inventor has appreciated that the fundamental problems associated with channel isolation/resolution can be expressed algebraically in similar terms to multi-user detection algorithms, as referenced above by J. Blantz et al and A. Klein et al.

In the Steiner code method described above, to estimate M channels the length of the PN code must be at least M times the maximum channel dispersion. In an N base station situation, each base station with M elements, while the Steiner method can continue to be used, the PN code length must be at least MN times the channel impulse response duration and each element of each base station would transmit an end-around rotated version of the code with a different unique offset. In the multiple base station situation, the differing round-trip propagation times to the subscriber unit must also be taken into account in the channel model so codes becomes increasingly extended. A more flexible option for allowing expansion of the number of serving base stations is to use an alternating sequence of different Steiner codes, each of which on its own is only just long enough for the number of elements in a single base station to be resolved.

To appreciate the present invention, it is preferable to consider a communication system having N active/serving base stations for a call, with each base station having a single transmitting element. If the N base stations each with a single element are received by a single element antenna of a subscriber unit, such as cellphone or terminal, then if the N bases simultaneously send N strings of N different pseudorandom bursts and such that there are $N^2$ different sequences altogether, then the individual channel impulse responses can be resolved at the terminal. In practice, the present invention is particularly interested in a three-base station situation which, statistically, occurs most frequently.

The base stations are preferably synchronised to a time accuracy much less than the duration of any cyclic prefix (which is typically of the order of about 10 µs to 20 µs for urban microwave propagation). The $m^{th}$ received burst is now the convolution:

$$y_t^{(m)} = \sum_{k=0}^{K} \sum_{n=1}^{N} s_{n,t-k}^{(m)} h_{n,k} + b_t^{(m)} \quad t = 1, \ldots T, m = 1 \ldots M$$

where b is the thermal noise component and K is the maximum dispersion in chips. After transformation into the DFT (frequency) domain, the equivalent, numerically efficient function can be expressed in the point-by-point product form:

$$Y^{(m)} = \sum_{n=1}^{N} S_n^{(m)} \otimes H_n + B^{(m)}$$

where $$\{y_0^m \ldots y_T^m\} \overset{DFT}{\Longleftrightarrow} Y_m$$

$$\{s_{n,0}^m \ldots s_{n,T}^m\} \overset{DFT}{\Longleftrightarrow} S_{m,n}$$

$$\{h_{n,0} \ldots h_{n,K-1}\} \overset{DFT}{\Longleftrightarrow} H_n$$

Thus, rather than performing a convolution of the channel impulse response $h_n$ with the $m^{th}$ sequence $s_{mn}$ from the $n^{th}$ base transmitter element, the present invention applies a DFT operation to both the received sequence $y_n$ and the various local replicas of the training sequences $s_{mn}$, and then does a multiplication together of the corresponding frequency bins of the received signal sequence $Y_n$ (being the signal sequence $s_n$ as received through a channel) with the corresponding frequency bins of the replica of the training sequence $S_{mn}$. Summation (i.e. concatenation) of the individual multiplication products associated with each channel provide a composite frequency response for the channel, the composite frequency response allowing, in the time domain, generation of the channel impulse response for the channel. The process of the present invention generally involves periodic buffering, for example, of frequency bin data and vector results pertaining to channel impulse responses, as will be appreciated by the skilled addressee.

In other words, taking an exemplary 128-point Fourier transform of both the received sequence y with the training sequence s yields one hundred and twenty-eight corresponding frequency bins in the frequency domain. Multiplication together of corresponding frequency bins of the received sequence with the same frequency bin of the signal (training) sequence S generates a matrix containing solvable linear equations in H and S. Summation (i.e. concatenation) of the individual multiplication products associated with each channel then provides a composite frequency response for that channel, which composite frequency response can be used in the time domain (through an inverse FFT) to provide a channel impulse response.

It will be appreciated that the channel is assumed constant for the duration of the burst events with respect to slow moving subscriber units, e.g. mobile units having a velocity of less than about ten kilometers per hour (10 kph).

In the DFT domain, the $k^{th}$ frequency bin received for the first burst can be expressed as the sum of components from the base stations and their channels:

$$Y_1^{(k)} = S_{11}^{(k)} H_1^{(k)} + S_{12}^{(k)} H_2^{(k)} + S_{13}^{(k)} H_3^{(k)} + B_1^{(k)}$$

Similarly, the $k^{th}$ frequency bin for the second burst can be expressed as;

$$Y_2^{(k)} = S_{21}^{(k)} H_1^{(k)} + S_{22}^{(k)} H_2^{(k)} + S_{23}^{(k)} H_3^{(k)} + B_1^{(k)}$$

And, finally, the $k^{th}$ frequency bin for the third burst is:

$$Y_3^{(k)} = S_{31}^{(k)} H_1^{(k)} + S_{32}^{(k)} H_2^{(k)} + S_{33}^{(k)} H_3^{(k)} + B_3^{(k)}$$

Rearranging the $k^{th}$ frequency bins provides a set of solvable linear equations in terms of H and S, namely:

$$\begin{pmatrix} Y_1^{(k)} \\ Y_2^{(k)} \\ Y_3^{(k)} \end{pmatrix} = \begin{bmatrix} S_{11}^{(k)} & S_{12}^{(k)} & S_{13}^{(k)} \\ S_{21}^{(k)} & S_{22}^{(k)} & S_{23}^{(k)} \\ S_{31}^{(k)} & S_{32}^{(k)} & S_{33}^{(k)} \end{bmatrix} \begin{pmatrix} H_1^{(k)} \\ H_2^{(k)} \\ H_3^{(k)} \end{pmatrix} + \begin{pmatrix} B_1^{(k)} \\ B_2^{(k)} \\ B_3^{(k)} \end{pmatrix}$$

which can be written in the matrix vector form at each frequency k bin (which for clarity is omitted);

$$Y = SH + B$$

It is now possible to define matrices and vectors containing all the transmitter elements and bursts:

$$S = \begin{pmatrix} S_1^{(1)} & S_2^{(1)} & S_3^{(1)} \\ S_1^{(2)} & S_2^{(2)} & S_3^{(2)} \\ S_1^{(3)} & S_2^{(3)} & S_3^{(3)} \end{pmatrix} \quad H = \begin{pmatrix} H_1 \\ H_2 \\ H_3 \end{pmatrix} \quad Y = \begin{pmatrix} Y^{(1)} \\ Y^{(2)} \\ Y^{(3)} \end{pmatrix} \quad B = \begin{pmatrix} B^{(1)} \\ B^{(2)} \\ B^{(3)} \end{pmatrix}$$

These equations are solved using a minimum mean square error (MMSE), e.g. Wiener filter, method providing, $$\hat{H} = (S^H S + Cov(B))^{-1} S^H Y$$

Here Cov(B) is the covariance matrix of the thermal noise, which is often approximated by an identity matrix $\sigma^2 I$. The equation immediately above can be considered a two entities, namely as a matched filter $S^H Y$ arranged to minimize the signal to noise ratio but not to remove mutual interference between channel estimates, followed by a decoupling matrix $(S^H S + Cov(B))^{-1}$ that removes the coupling between different channels caused by the non-ideal nature of the PN sequences. The inverse DFTs for each radio channel are therefore of the form:

$$\begin{pmatrix} H_1^{(0)} \\ H_1^{(1)} \\ H_1^{(2)} \\ \vdots \\ H_1^{(z)} \end{pmatrix} \overset{iDFT}{\Longrightarrow} \begin{pmatrix} h_1^{(0)} \\ h_1^{(1)} \\ h_1^{(2)} \\ \vdots \\ h_1^{(z)} \end{pmatrix}, \begin{pmatrix} H_2^{(0)} \\ H_2^{(1)} \\ H_2^{(2)} \\ \vdots \\ H_2^{(z)} \end{pmatrix} \overset{iDFT}{\Longrightarrow} \begin{pmatrix} h_2^{(0)} \\ h_2^{(1)} \\ h_2^{(2)} \\ \vdots \\ h_2^{(z)} \end{pmatrix}, \ldots$$

where z is the frequency bin (or its time domain equivalent).

The decoupling matrix term $S^H S$ is a matrix product, where $S^H$ is the conjugate transpose of the sequence, i.e. the transposed matrix with all elements complex conjugated. The covariance matrix $<BB^H>$ is the time averaged outer product of the noise vector, or in element-by-element terms:

$$<BB^H> = \begin{pmatrix} <b_1 b_1^*> & <b_1 b_2^*> & <b_1 b_3^*> & \ldots \\ <b_2 b_1^*> & <b_2 b_2^*> & \ldots & \ldots \\ <b_3 b_1^*> & <b_3 b_2^*> & \ldots & \ldots \\ \ldots & \ldots & \ldots & \ldots \end{pmatrix}$$

In terms of each channel, concatenation of the numerous frequency bins allows generation of time domain vectors of the channel impulse response for a channel, the time domain vectors being generated from an inverse DFT process within a suitable processing block, such as an ASIC or control processor 150 (of FIG. 1).

It is now possible to extend the basic concept of multiple channel estimation to a situation in which each base station has a plurality of transmit elements; this scenario arises in, for example, systems employing space time coding (STC) or MIMO. It will be appreciated that STC is a collection of techniques for transmitting a number of parallel data streams from multiple transmit antennas with the aim of increasing bit rate for a given total transmitter power. In STC, it will be appreciated that the 2×2 frame structure is expanded to an N-element array, usually having at least four transmit elements. For example, in a four element STC transmitting antenna we might organise the user data in blocks of four symbols and transmit them in different order from the four elements via 16 channels to 4 receiving elements. This is a natural extension of the two element STTD procedure, the main difference from STTD being that multiple receiving elements are essential to get a bandwidth expansion in STC whereas SUD is aimed purely at improving the reliability of the received data and is not concerned with bit rate expansion. Thus STTD will function with a single receive antenna, while STC requires a minimum of two. The principle difference between an STTD arrangement (that is discussed in detail below) and STC is that each component of the block vectors and block matrices (for STTD given below) contains an increasing number of elements (i.e. CIR samples, transmitted data samples and received data samples) consistent with the adopted coding method in each STC derivative.

Figure 5:
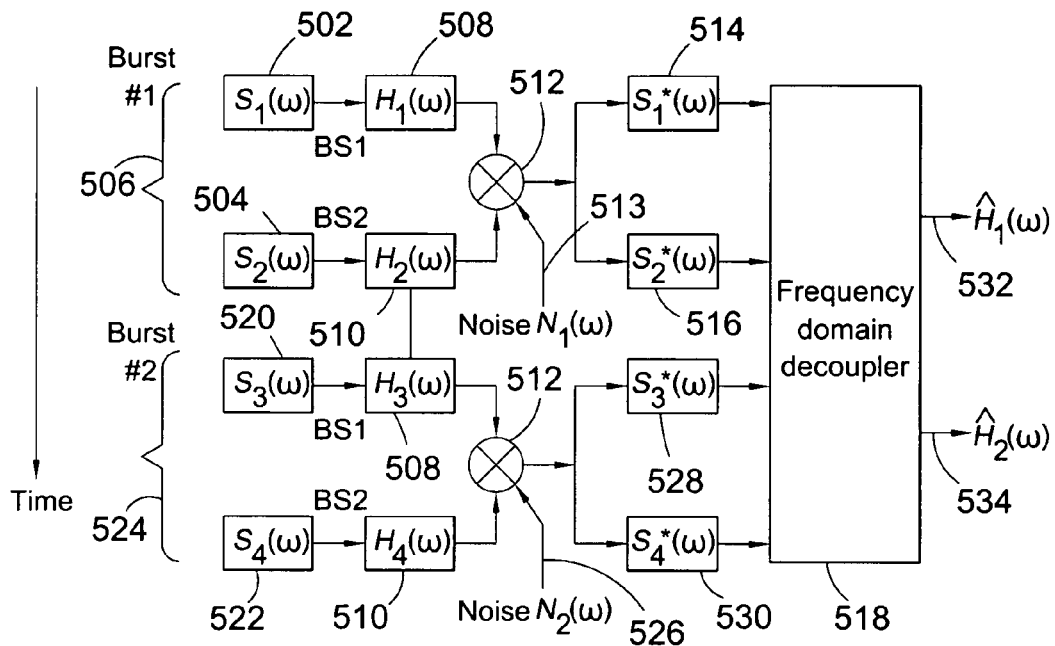
FIG. 5 a schematic block diagram of the channel estimation process and architecture according to a preferred embodiment of the present invention.

Referring briefly to FIG. 5, which is generally complementary to FIGS. 1, 3 and 4, there is shown a schematic block diagram of the channel estimation process and architecture 500 of a preferred embodiment of the present invention. The process is based on a two base station (BS1 and BS2) transmission environment having two training bursts. The training sequences $s_x(\omega)$ are, in this exemplary case, Gold codes, with individual first 502 and second 504 training sequences transmitted in a first burst 506. The first training sequence 502 is subjected to first channel 508, whereas the second training sequence is subjected to a second channel 510. Both channels are combined at the receiver 512 and are further subject to a first noise component $(N_1(\omega))$ 513. In this exemplary case, first and second matched filters 514 and 516 provide a time reversed conjugated inversion of the respective first and second training sequences 502 and 504, with outputs from the first and second matched filters 514 and 516 provided to a frequency domain decoupler 518 supporting the frequency domain decoupling matrix $(S^H S + Conv(B))^{-1}$. Third 520 and fourth 522 training sequences transmitted in a second burst 524 are respectively subjected to first channel 508 and second channel 510. Both channels are combined at the receiver 512 and are further subject to a second noise component 526 (typically different to the first noise component). In this exemplary case, third 528 and fourth 530 matched filters provide a time reversed conjugated inversion of the respective third and fourth training sequences 520 and 522, with outputs from the third and fourth matched filters 528 and 530 provided to the frequency domain decoupler 518. The frequency domain decoupler then provides channel impulse response vectors $\hat{H}_1(\omega)$ and $\hat{H}_1(\omega)$ (reference numerals 532 and 534) for the first and second channels, respectively, based on the foregoing point-by-point manipulation of individual (frequency domain) frequency bins.

The preferred embodiment of the present invention therefore shows how accurate channel estimation is possible through the use of Wiener frequency domain MMSE deconvolution combined with frequency domain spatial decoupling matrices, with quasi-orthogonal Gold codes allocated to base stations and their antenna elements.

The principles of the present invention can also be applied to resolve multiple channels by a single training burst; this has particular application in OFDM systems where it may not be possible to transmit Steiner codes because of hardware constraints. The present invention can be modified, in the fashion now shown, to operate with a single arbitrary training sequence yet still resolve multiple channels in a least squares sense. A single training burst situation is algebraically undetermined in the two channel case. If the burst is of length L, there are 2L unknowns in the two channels which cannot be determined from L observations at one antenna. However, if there are also ½L linear constraints associated with each channel impulse response the equations become solvable again. The simplest constraints are that the channel impulse responses $\{h_0 \ldots h_k\}$ are of finite duration. If K<½L then we write the equations as follows. Let $S_m$ be the circulant matrices representing the training bursts and $H_m$ be the IR vectors for channels #1 and #2. However, with a matrix solution which is not circulant, the ability to use FFTs is lost, but resolution of the channels is still possible with use of a matrix of the form:

$$Y = \begin{bmatrix} s_{10} & 0 & s_{20} & 0 \\ s_{11} & s_{10} & s_{21} & s_{20} \\ s_{12} & s_{11} & s_{22} & s_{21} \\ 0 & s_{12} & 0 & s_{22} \\ 0 & 0 & 0 & 0 \end{bmatrix} \begin{bmatrix} h_{10} \\ h_{11} \\ h_{20} \\ h_{21} \end{bmatrix}$$

In generality, with respect to two parallel channels using a single training burst, if there are a large number of linear constraints C attached to the channel impulse responses (such as finite durations) then a number of channels can be solved with a single training burst. Algebraically, if the there are $N_C$ constraints on each channel vector of L elements and C channels, the sum of the number of independent degrees of freedom is $C(L-N_C)$. If the length of the training sequence is $N_T \geq C(L-N_C)$, then all of the independent degrees of freedom can be solved; this method is used in Steiner codes to estimate multiple channels using a single training sequence Whilst benefits are attained through use of the channel impulse response estimation scheme described so far (in which the number of processing blocks is equal to the total number of channels to avoid code contention problems), some processing efficiency (i.e. DSP load) associated with Steiner codes is lost since there is a requirement to invert a matrix in each frequency bin whose dimension is equal to the number of channels, i.e. the number of transmitting cells times the number of base antenna elements per cell.

Figure 6:
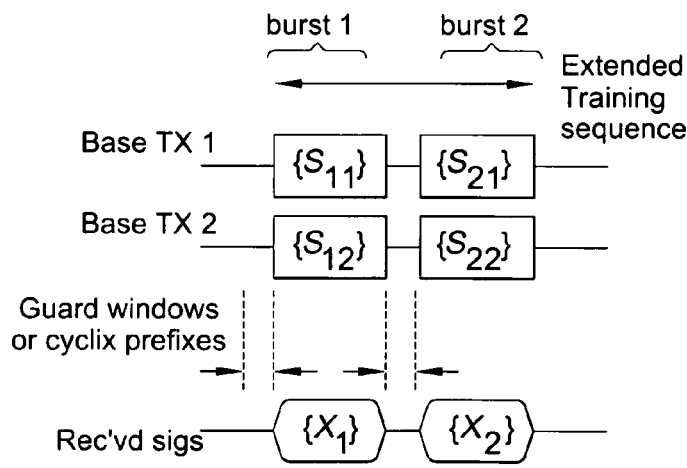
FIG. 6 is a Steiner code variant of FIG. 4.

In a further preferred embodiment of the present invention, therefore, the training sequence transmissions of FIG. 4 are implemented as Steiner cyclic training sequence variant; this is shown in FIG. 6 in which successive bursts 602 and 604 from different base stations BS1 and BS2 contain repeated sequence portions of an entire training sequence. This particular embodiment of the present invention offers an optimum combination of frequency domain Wiener filtering and MMSE spatial decoupling for the estimation process. The high accuracy of channel estimation that the combination of techniques offers is a desirable if not essential for coherent null steering and soft hand off in COMA and OFDM. The sequences $\{s_{11}\}$, $\{s_{21}\}$, $\{s_{12}\}$, $\{s_{22}\}$ are four linearly independent random sequences transmitted in pairs from the two antennas as shown. These sequences transform into the DFT domain as $S_{11}$, $S_{21}$, $S_{12}$, $S_{11}$. Similarly the channel impulse responses are $H_1$, $H_2$ in the OFT domain (for the two channels in the exemplary case of a two base station system having single transmit elements). The receiver samples the two received blocks and, via a DFT function, transforms them to the Frequency domain as $Y_1$ and $Y_2$. The required guard intervals, which prevent dispersion contamination by unknown data, are already provided in the Steiner sequences and additional, i.e. separate, provisioning of guard periods is not therefore required. The two received blocks are superpositions of convolutions of the transmitted sequences with the channels and are modelled by point by point equations in the DFT domain as follows:

$$\begin{bmatrix} Y_k^1 \\ Y_k^2 \end{bmatrix} = \begin{bmatrix} S_k^{11} & S_k^{12} \\ S_k^{21} & S_k^{22} \end{bmatrix} \begin{bmatrix} H_k^1 \\ H_k^2 \end{bmatrix} + \begin{bmatrix} N_k^1 \\ N_k^1 \end{bmatrix} \quad k = 0 \ldots, 2^n - 1$$

or Y(k)=S(k).H(k)+(N(k) which has a least squares solution $$\hat{H}(k)_{LS} = (S(k)^H S(k))^{-1} S(k)^H Y(k) \quad k=0 \ldots 2^n-1$$

in each frequency bin and can be shown to have a MMSE solution $$\hat{H}(k)_{MMSE} = (S(k)^H R_N^{-1} S(k) + R_H^{-1})^{-1} S(k)^H R_N^{-1} Y(k)$$

Where $R_N$ is the noise covariance and $R_H$ is the channel covariance. In general, for $N_{TX}$ transmitters, there are $N_{TX}$ channels to estimate and $N_{TX}$ blocks of pilot or training sequences are required for a solution.

Since the S matrix in the basic equation above has no particular orthogonality properties, matched filtering is not advisable. Instead, if the following MMSE matrix operation is performed at each frequency; the result combines spatial decoupling with a Wiener frequency weighting function and overall gives an MMSE solution. It requires a 2×2 matrix inversion in each frequency bin for two cell operation (with each base station having a single transmit element):

$$\begin{bmatrix} \hat{H}_k^1 \\ \hat{H}_k^2 \end{bmatrix} = \left( \begin{bmatrix} S_k^{11} & S_k^{12} \\ S_k^{21} & S_k^{22} \end{bmatrix} + \sigma^2 I \right)^{-1} \begin{bmatrix} Y_k^1 \\ Y_k^2 \end{bmatrix} \quad k = 0 \ldots, 2^n - 1$$

By combining Steiner cyclic pilot rotation for transmissions from the transmit elements of each base station according to the present invention, interference-free mobiles near a centre of the cell are allowed to resolve their channels in the usual (conventional) way. At the cell periphery where interference becomes significant, the training sequences need to be expanded to provide enough degrees of freedom such that the simultaneous equations for all of the channels become algebraically determinate; a repeating pattern of the Steiner PN sequences allows this to occur.

Using the MMSE formulas described in the Klein paper identified above, we get the following alternative forms of the above MMSE equation $$\hat{H}(k)_{MMSE} = R_H S(k)^H (S(k) R_H S(k)^H + R_N)^{-1} Y(k)$$

$$= [I + (R_H S(k)^H R_N^{-1} S(k))^{-1}]^{-1} \hat{H}(k)_{LS}$$

The last equation shows that the LS estimate above can be calculated first and then transformed into an MMSE one. If we set $R_N = \sigma_N^2 I$ and $R_H = \sigma_H^2 I$ in MMSE equation above, then $$(\hat{H}(k))_{MMSE} = \left( (S(k))^H S(k) + \frac{\sigma_N^2}{\sigma_H^2} I \right)^{-1} (S(k))^H Y(k)$$

However $R_N$ is modified by the dispersive channel. It is possible to estimate $R_N$ on-line since the auto- and cross-covariance statistics of the received pilots and data are effectively identical. The covariance of the noise vector is block diagonal since the statistics of consecutive blocks are independent and for example in an $N_{TX}=3$ case, $R_N$ has the form $$R_N(k) = \begin{bmatrix} R_{YY}(k) & 0 & 0 \\ 0 & R_{YY}(k) & 0 \\ 0 & 0 & R_{YY}(k) \end{bmatrix}$$

where $R_{YY}(k)$ is the estimated signal covariance measured across the receiver elements at frequency k. Note that $R_{YY}$ contains a component due to the pilot signal itself (at −10 dB) as well as the target interfering data signals which can be cancelled as necessary.

Both the matrix solutions of the least squares estimate and the MMSE estimate compensate for channel estimation errors caused by a pilot signal which has a non-uniform power spectrum and a non-zero autocorrelation. When these equations are solved instead of a simple correlation of the form:

$$\hat{H}_{i1}(k) = F_1(k)^*(H_{i1}(k)F_1(k) + H_{i2}(k)F_2(k))$$
$$= |F_1(k)|^{2^*} H_{i1}(k) + F_1(k)^* F_2(k) H_{i2}(k)$$

$$\hat{H}_{i2}(k) = F_2(k)^*(H_{i1}(k)F_1(k) + H_{i2}(k)F_2(k))$$
$$= F_2(k)^* F_1(k) H_{i1}(k) + |F_2(k)|^2 H_{i2}(k)$$

where F(k) is the pilot or training sequence (equivalent to S(k) above), the solutions are consistent in the sense that as the SNR or the pilot sequence duration increases to a large value, the estimated channel taps converge asymptotically on their true values. This is not true for the simple correlation.

While no MIMO radio standards presently exist which allow for such multiple pilot sequences, existing pilot blocks can be subdivided into smaller sections at the terminal to generate the necessary equations so the dual pilot block method is compatible with Release 5 pilot arrangements (3G Specification TSG TS25.211; "Physical channels and mapping of transport channel on physical channels (FDD)", Release '99, October 1999, ftp://ftp.3gpp.org/Specs/2000-06/R1999/25_series/25211-330.zip). Either the estimator can use two consecutive slots in the frame to estimate the channel, getting uncorrelated scrambling codes, or a single slot can be divided into two parts. These choices involve trades-offs between Doppler and noise sensitivity. If there are M>2 TX antennas, the number of sequences required to algebraically determine the channels increases to M per antenna, a total of $M^2$ altogether, transmitted in M blocks.

Figure 7:
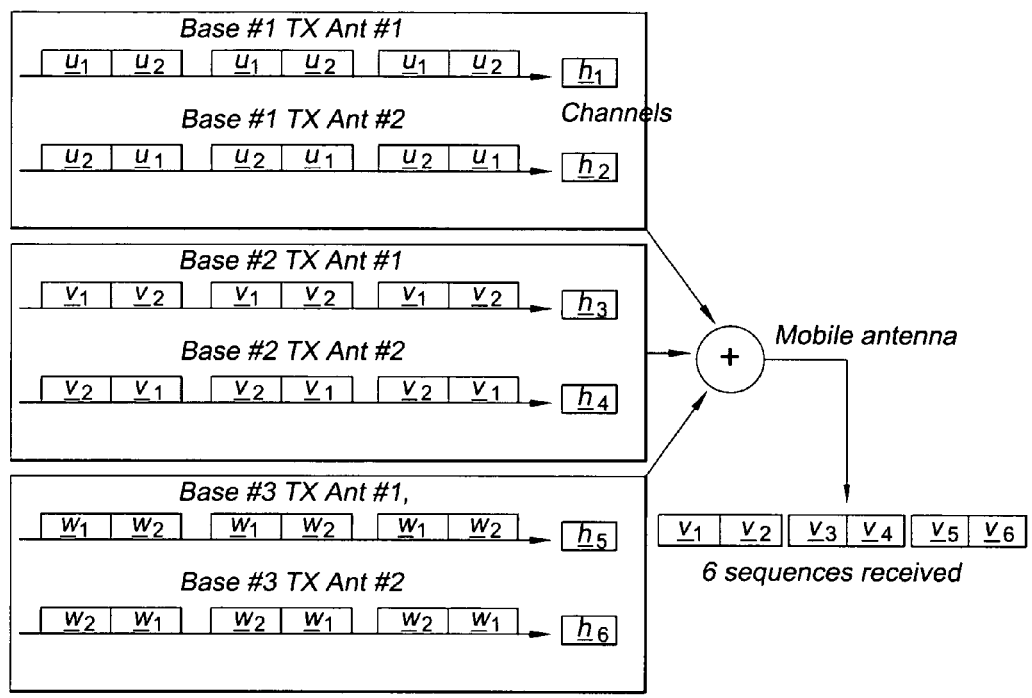
FIG. 7 is a schematic diagram of a receiver receiving six training sequences form three base stations.

In the exemplary case where a receiver observes six sequences, as shown in FIG. 7, the result in the Fourier domain is that there are sufficient degrees of freedom to solve for six channels $\{h_1\}$ to $\{h_6\}$. It should be noted that in FIG. 7, the introduction of sign reversals allows for a distinction to be drawn between codes in successive bursts, with the mechanism of sign reversal therefore reducing the overall number of Steiner codes required to implement a system according to the present invention. The equations relating the received signal Y to the sequences U, V, W and the channels H in the frequency domain are:

$$\begin{bmatrix} Y_1^{(k)} \\ Y_2^{(k)} \\ Y_3^{(k)} \\ Y_4^{(k)} \\ Y_5^{(k)} \\ Y_6^{(k)} \end{bmatrix} = \begin{bmatrix} U_1^{(k)} & U_2^{(k)} & V_1^{(k)} & V_2^{(k)} & W_1^{(k)} & W_2^{(k)} \\ U_2^{(k)} & U_1^{(k)} & V_2^{(k)} & V_1^{(k)} & W_2^{(k)} & W_1^{(k)} \\ U_1^{(k)} & U_2^{(k)} & -V_1^{(k)} & -V_2^{(k)} & W_1^{(k)} & W_2^{(k)} \\ U_1^{(k)} & U_2^{(k)} & -V_2^{(k)} & -V_1^{(k)} & W_2^{(k)} & W_1^{(k)} \\ U_1^{(k)} & U_2^{(k)} & V_1^{(k)} & V_2^{(k)} & -W_1^{(k)} & -W_2^{(k)} \\ U_1^{(k)} & U_2^{(k)} & V_2^{(k)} & V_1^{(k)} & -W_2^{(k)} & -W_1^{(k)} \end{bmatrix} \begin{bmatrix} H_1^{(k)} \\ H_2^{(k)} \\ H_3^{(k)} \\ H_4^{(k)} \\ H_5^{(k)} \\ H_6^{(k)} \end{bmatrix} + \begin{bmatrix} N_1^{(k)} \\ N_2^{(k)} \\ N_3^{(k)} \\ N_4^{(k)} \\ N_5^{(k)} \\ N_6^{(k)} \end{bmatrix}$$

$$k = 0 \ldots 2^n - 1$$

However this is an inefficient algebraically redundant representation that can be simplified as follows. At the mobile terminal, for example, the signal from a given antenna at a base station is the circular convolution of the PN sequence $\{s\}$ with the channel impulse response $\{h\}$:

$$y_k = \sum_{j=0}^{N-1} s_{k-j \, MODN} h_j \quad k = 0 \ldots 2^n - 1$$

The cyclic shift of the PN sequence for second base element in the Steiner method can be replaced by a reverse shift of the channel impulse response to give exactly the same signal at the subscriber unit:

$$y_k = \sum_{j=0}^{N-1} s_{k-j-\frac{N}{2} MODN} h_j$$
$$= \sum_{j=0}^{N-1} s_{k-j} h_{j+\frac{N}{2} MODN}$$

Cyclic shifting of channel impulse responses $h_2$, $h_4$ and $h_6$ (of FIG. 7) takes into account the reverse shift as detailed immediately above with the effect that the six sequences received at the antenna of the subscriber (or other addressed unit) are $\underline{Y}_1$, $\underline{Y}_2$, $\underline{Y}_3$, $\underline{Y}_4$, $-\underline{Y}_5$ and $-\underline{Y}_6$. Moreover, the six sequences are obtained from a repetition of only three Steiner codes that are individually and uniquely assigned to each base station, i.e. both transmit elements send identical sequences in the same burst, with the subscriber unit generating a cyclically shifted channel impulse response $\underline{h}_x$ for one of the two radiating elements of the base station's transmit array. This reverse shift manipulation results in only three different PN sequences being utilised in this particular embodiment, with the channel impulse responses of FIG. 7 taking the form $(\underline{h}_1+\underline{h}'_2)$, $(\underline{h}_5+\underline{h}'_4)$ and $(\underline{h}_5+\underline{h}_6)$ to provide the received sequence $\underline{Y}_1$, $\underline{Y}_2$, $\underline{Y}_3$, $\underline{Y}_4$, $-\underline{Y}_5$ and $-\underline{Y}_6$. The determinant of the sign change matrix of this solution is 4, as shown below:

$$\begin{vmatrix} 1 & 1 & 1 \\ 1 & -1 & 1 \\ 1 & 1 & -1 \end{vmatrix} = 4$$

Writing

-continued $$y_1 = \begin{bmatrix} y_1 \\ y_2 \end{bmatrix} \quad y_2 = \begin{bmatrix} y_3 \\ y_4 \end{bmatrix} \quad y_3 = \begin{bmatrix} y_5 \\ y_6 \end{bmatrix}$$

$$h_1 = \begin{bmatrix} h_1 \\ h_2 \end{bmatrix} \quad h_2 = \begin{bmatrix} h_3 \\ h_4 \end{bmatrix} \quad h_3 = \begin{bmatrix} h_5 \\ h_6 \end{bmatrix}$$

$$u_1 = \begin{bmatrix} u_1 \\ u_2 \end{bmatrix} \quad v_1 = \begin{bmatrix} v_1 \\ v_2 \end{bmatrix} \quad w_1 = \begin{bmatrix} w_1 \\ w_2 \end{bmatrix}$$

with Fourier transforms:
$y_1 \Rightarrow Y_1 \; y_2 \Rightarrow Y_2 \; Y_3 \Rightarrow Y_3$
$h_1 \Rightarrow H_1 \; h_2 \Rightarrow H_2 \; h_3 \Rightarrow H_3$
$u \Rightarrow U \; v \Rightarrow V \; w \Rightarrow W$ then a reduced set of more easily solvable equations in the DFT domain is obtained, namely:

$$\begin{bmatrix} Y_1^{(k)} \\ Y_2^{(k)} \\ Y_3^{(k)} \end{bmatrix} = \begin{bmatrix} U^{(k)} & V^{(k)} & W^{(k)} \\ U^{(k)} & -V^{(k)} & W^{(k)} \\ U^{(k)} & V^{(k)} & -W^{(k)} \end{bmatrix} \begin{bmatrix} H_1^{(k)} \\ H_2^{(k)} \\ H_3^{(k)} \end{bmatrix} \quad k = 0 \ldots 2^n - 1$$

Provided a resultant matrix in this set of equations is well conditioned and invertible, then the set of channel impulse responses can be solved. A sampling design for the repetitions that offers near-orthogonality between repeated sequences is, however, required, such that different bases can be resolved without ill-conditioning of the equations. Such designs, as used for space-time codes, are readily available in statistics literature.

By employing the preferred embodiment of the present invention where Steiner codes supplement to point-by-point DFT multiplication mechanism, accuracy in estimated channel impulse responses is limited by channel noise rather than imperfection in the codes.

The preferred embodiment that uses Steiner codes for m base antenna elements can be used in multiple cells and MMSE channel estimation is obtainable for a number n of bases giving a total of nm downlink channels. Different cells will use a different basic PN code, whereas the elements within a single cell will use the Steiner cyclic offsets of a single PN code. The extra workload (processing overhead) involved is the inversion of an n×n matrix in each frequency bin. The inclusion of the use of Steiner codes to supplement the basic inventive concept of Wiener frequency domain MMSE deconvolution combined with frequency domain spatial decoupling matrices results in the possibility of allocating only a single training sequence to each base station provided that the training sequence is of sufficient length to encompass all the multiple time-translated channel impulse responses.

Embodiments of the invention may be implemented as computer program code encoded on a computer program product for use with a computer system. It is expected that such a computer program product may be distributed as a removable medium with accompanying printed or electronic documentation (e.g. shrink-wrapped software), preloaded with a computer system or distributed from a server or electronic bulletin board over a network (e.g. the Internet or World Wide Web). A series of computer instructions can therefore either be fixed on a tangible medium or fixed in a computer data signal embodied in a carrier wave that is transmittable to a computer system using wireline or wireless transmission techniques. For example, the present invention can find application as downloadable code in a software radio. The removable (i.e. tangible) medium may be a computer readable media, such as a diskette, CD-ROM, DVD-ROM or RAM, fixed disk, magnetoptical disks, ROMs, flash memory or magnetic or optical cards. The series of computer instructions embodies all or part of the functionality previously described herein with respect to the system.

Software embodiments of the invention may be implemented in any conventional computer programming language. For example, preferred embodiments may be implemented in a procedural programming language (e.g. "C") or an object oriented programming language (e.g. "C++").

Although the preferred operating method is realised by general or specific-purpose processor or logic circuits programmed with suitable machine-executable instructions, hardware components may possibly be used to implement certain features of the present invention. Of course, the present invention may be performed by a combination of hardware and software.

It will, of course, be appreciated that the above description has been given by way of example only and that modifications in detail may be made within the scope of the present invention. For example, while the preferred embodiment is has been described in relation to a multi-cast system in which each base station has a single transmit element, the present invention is clearly applicable to multi-element transmitters and to single isolated cells supporting transmissions from a single base station having a transmit array. Furthermore, while the preferred embodiment has been described in the context of a CDMA system, the present invention is generally applicable to any dispersive or imperfect channel that acts to corrupt symbols, including systems employing TDD and FDM techniques and other types of links, such as digital subscriber lines (DSL) and all digital transmission systems.

Indeed, although the technique of the preferred embodiment of the present invention has been described for a CDMA application where the number of chips in the training burst is easily identified, the principles of the present invention apply to OFDM, wavelets (e.g. Daubechies's wavelets) and any similar orthogonal or near-orthogonal signaling waveforms. With specific regard to an OFDM signal, such an OFDM signal is treated as a single wide-band modulated carrier in the time domain and an estimate of the time domain channel impulse response is made in an identical way to that described in the preferred embodiment. If a constraint is made that the duration of the impulse responses is small, the equations become algebraically soluble (or "observable" in the context of control theory jargon) and in this way a large number of parallel channels can be estimated using a single training burst.

If the duration of the OFDM training burst is $N_s$ sub-carrier symbols and there are $N_F$ sub-carriers then the burst effectively has $N_s * N_F$ samples or chips which is quite a substantial number. In practice, this means that multiple channel estimation in OFDM might not be too difficult. The lower limit for the duration of the training sequences would be that it must be capable of supporting an orthogonal, or at least a linearly independent, set of codes for say m base station antennas seen from the terminal (in one or more cells). Superficially, this would require m full sub-carrier slots and for HSD with 150 µs slots we need a duration of 150 m µs. However the wideband methods described here only require that the duration of the training sequence is ≧m times the duration of the channel impulse response so, for a channel with τ µs dispersion and signal bandwidth B MHz, the duration of the training sequence need only be τBm samples. For example, if the signal bandwidth is 6 MHz, the channel dispersion is 5 μs and there are seven base station antennas with channels to be determined, the minimum duration of the training sequence is 210 samples or 6×5× ⅞=35 μs, i.e. only ⅕ of a nominal sub-carrier symbol. In practice, however, this duration would need to be increased significantly (and preferably about ten-fold or so) to improve estimation accuracy.

In transmission bursts from base stations having single transmit elements, cyclic prefixes could be replaced by blank (zero) carriers to provide isolation between burst sequences.

A technique for improving channel estimations (obtained using the above MMSE multivariate technique or in another way) using a long-term power-delay profile (PDP), is now described.

The ITU has defined channel impulse responses for 3G mobiles which are truncated at a few microseconds:

Pedestrian and Outdoor to Indoor; A and B: 0.41 and 3.7 μs respectively (1.6 and 14.2 chips)
  Vehicular; A and B: 2.51 and 20 μs respectively (9.64 and 76.8 chips)

and the relative multipath powers are quite small at these extremes; typically around −20 dB. In any type of estimation it is advisable to estimate as few parameters as possible since introducing unnecessary degrees of freedom is not necessarily a neutral procedure. The extra parameters may be given phantom values created from the noise and interference which degrade performance. Also, an equalizer, given enough degrees of freedom, can condition the random noise in a finite window to become highly correlated with the pilot signal and reduce the output MS pilot error but this corrupts the desired signal even more and increases BER.

A suitable procedure using the matrix-vector algebra presented above, can be derived. It can be shown that:

$$\hat{H}_{MMSE} = (P^H R_{NN}^{-1} P + R_{HH}^{-1})^{-1} P^H (R_{NN}^{-1} X + R_{HH}^{-1} H_0)$$

Where $\hat{H}$ is the channel matrix, $H_0$ is a prior mean value estimate of an element H, $R_{HH}$ is the channel covariance and $R_{NN}$ is the noise covariance.

Figure 8:
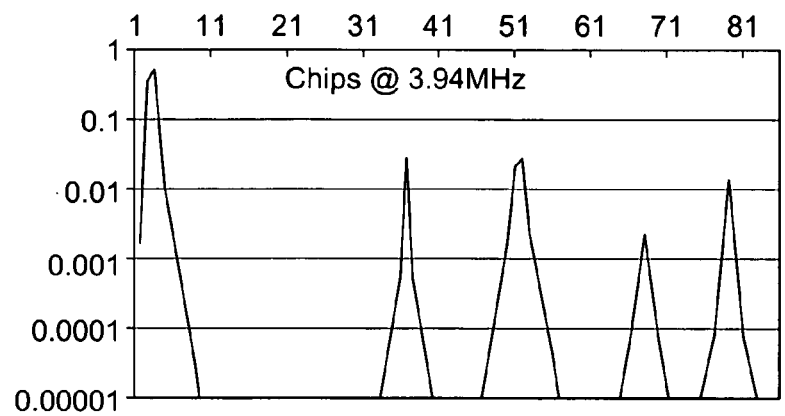
FIG. 8 is a plot of the Power delay Profile for the ITU Veh-B channel model.

Both the H covariance $R_{HH}$ and $H_0$ can be used as a vehicle to inject prior knowledge into the estimation. Typically we have no prior knowledge of the complex values of the channel taps in the impulse response but know their likely variance, either from a general statistical knowledge of the channel and its likely dispersion or from long term observations in situ. If $R_{HH}$ is diagonal, i.e. the channel taps are uncorrelated, its diagonal values represent the expected power-delay profile of the channel. FIG. 8 shows the power-delay profile of the ITU vehicular-B channel. Such a profile could be estimated by the UE over a long term and used as diagonal entries in $R_{HH}$.

As a simpler approximation, working with a DFT block size of say 4096 and the Ped-A model of duration 4 μs, we know that channel taps 0 to 15 are likely to have |h$_k$| values up to unity while taps 16 to 4095 are zero. Thus we can partition the $R_{HH}$ matrix into four sections as shown to reflect these expected values.

$$R_{HH} = \begin{bmatrix} I_{16 \times 16} & 0 \\ 0 & 10^{-6} I_{4080 \times 4080} \end{bmatrix}$$

Ideally the lower 4080×4080 submatrix should be set to exactly zero but then the overall problem becomes singular as it stands and is difficult to solve. Inversion of the lower submatrix of $R_{NN}^{-1}$ gives large ($10^6$) diagonal values in the solution to the MMSE equation whose effect is to swamp values in rows and columns 16 to 4095 in the matrix $(P^H R_{NN}^{-1} P + R_{HH}^{-1})$ and ultimately to set them to zero in the inverse $(P^H R_{NN}^{-1} P + R_{HH}^{-1})^{-1}$. Effectively the solution is projected onto a subspace orthogonal to columns 16 to 4095 of the matrix $P^H R_{NN}^{-1} P$.

Figure 9:
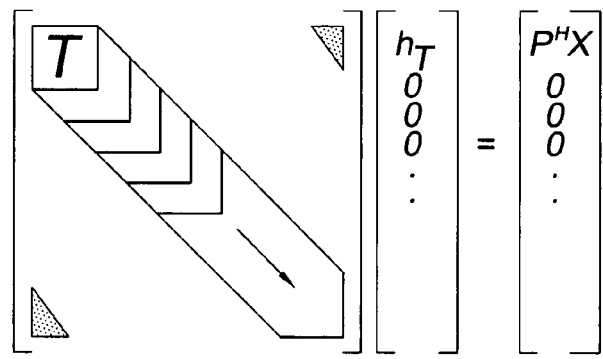
FIG. 9 is a schematic diagram of a diagonalised circulant matrix.

Examining what is left:

$$\begin{bmatrix} \hat{H}_{MMSE}^{TRUNC} \\ 0 \\ \vdots \end{bmatrix} = \begin{bmatrix} (P^H R_{NN}^{-1} P)_{16 \times 16}^{-1} & 0 & \cdots \\ 0 & 0 & \cdots \\ \vdots & \vdots & \ddots \end{bmatrix} \begin{bmatrix} (P^H X)_{16 \times 1} \\ 0 \\ \vdots \end{bmatrix}$$

we have a truncated matrix $P^H R_{NN}^{-1} P$ which is Toeplitz rather than circulant and so is incompatible with FFT's. In order to further reduce the complexity of the problem, an approximate solution can be obtained in Fourier space by extrapolation of the Toeplitz matrix to a circulant matrix. Writing $T = P^H R_{NN}^{-1} P$, the diagonals of T are extrapolated right down the leading diagonals of a large (up to 4096× 4096) empty matrix to produce a circulant (FIG. 9)

In the FFT method the equivalent sequence of operations can be found by introducing an DFT matrix F, where the product $FF^H$ is an identity matrix. The MMSE equation then becomes $$F\hat{H}_{MMSE} = F(F^H P^H F F^H R_{NN}^{-1} F F^H P F + F^H R_{NN}^{-1} F)^{-1}$$
$$F^H F P^H F F^H R_{NN}^{-1} F F^H X$$

For circulant P and diagonal $R_{NN}$ we have $F^H P^H F = \Lambda_P F^H R_{NN}^{-1} F = \sigma^2 I$ and the last equation becomes $$F\hat{H}_{MMSE} = F(\Lambda_P^H \sigma^2 I \Lambda_P + F^H R_{HH}^{-1} F)^{-1}$$
$$F^H \Lambda_P^H \sigma^2 I \Lambda_P F^H X$$

Everything in this equation can be identified as a simple FFT method except for the matrix $R_{HH}$. This matrix is to approximate the equivalent of $P^H R_{NN}^{-1} P$, $$P^H R_{NN}^{-1} P \Rightarrow A(\omega_k) = \frac{|P(\omega_k)|^2}{|R(\omega_k)|}$$

$A(\omega_k)$ is then IFFT transformed to the time domain autocorrelation function, $a(\tau)$, this is truncated at $\pm T_{max}$, the maximum duration of the channel impulse response, then FFT transformed back to the frequency domain. This spectrum is then equivalent to the time-truncated circulant matrix above. In the case of a MIMO situation the matrix $P^H R_{NN}^{-1} P$ is block circulant rather than a simple circulant but this can easily be accommodated within the same general solution.

A second estimation method uses a non-informative prior, a LS estimation procedure, and inserts known channel tap variances after the H vector has been obtained. The reasoning behind this method is that if the covariance of the estimated taps in a derivation of the MMSE equation:

$$\hat{H}_{MMSE} = \left(P^H P + \frac{\sigma_N^2}{\sigma_H^2} I\right)^{-1} P^H X$$

(assuming $R_{HH}$ and $R_{NN}$ are both identity matrices) is almost diagonal then it should not matter whether the H covariance is used within or after the equation. For example, setting $\sigma_H^2=1$ for all taps initially (a reasonable guess for channel taps known to be less than unity in value) then we get a first estimate $H_1$:

$$\hat{H}_1 = (P^H R_{NN}^{-1} P + R_{HH}^{-1})^{-1} P^H R_{NN}^{-1} X \approx (\Lambda^{-1} + \sigma_H^{-1} I)^{-1} P^H R_{NN}^{-1} X$$

then we can approximate the full MMSE procedure with a known $R_{HH}$ by $$\hat{H}_{MMSE} = (\Lambda^{-1} + R_{HH}^{-1})^{-1} (\Lambda^{-1} + \sigma_H^{-2} I) \hat{H}_1$$

and letting $\Lambda = \lambda I$ corresponding to an uncorrelated thermal noise with near-orthogonal pilots and $R_{HH} = \text{Diag}(\rho_1, \rho_2, \ldots)$ then $$\hat{H}_{MMSE} = \text{Diag}\left(\frac{\lambda + \rho_k}{\lambda \rho_k}\right)^{-1} \text{Diag}\left(\frac{\lambda + \sigma^2}{\lambda \sigma^2}\right) \hat{H}_1$$

$$= \text{Diag}\left(\frac{\rho_k}{\sigma^2} \cdot \frac{\lambda + \sigma^2}{\lambda + \rho_k}\right) \hat{H}_1$$

Figure 10:
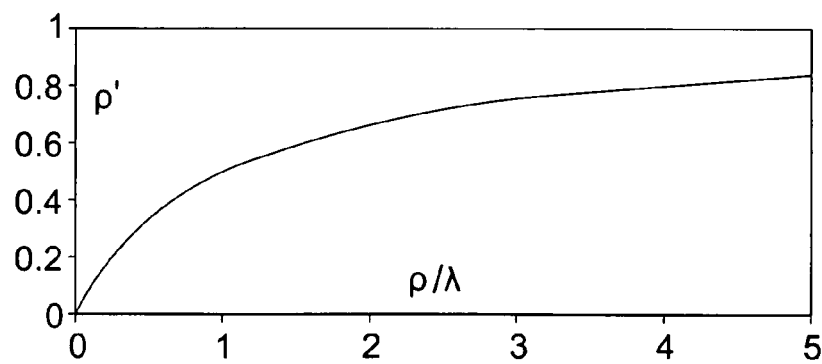
FIG. 10 is a plot showing the significance weighting of a channel tap estimate.

The action of this equation is to suppress tap estimates in the vector $H_1$ whose a-priori standard deviation values $\rho_k$ lie below the estimation standard deviation $\lambda$ of the LS estimator (FIG. 10), independently of the actual observed tap values. The $\rho_k$ values are determined by long term observations of channel tap estimates on a lengthy sequence of slots and are parameter deviations rather than estimation accuracies while the $\lambda$ values derive from the pilot sequences and knowledge of the interference source (thermal noise+superimposed data).

Thus this Bayesian technique is not a linear channel-tap predictor in the "long range prediction" sense suggested, for example in, R1-01-0025: "On the need of Long-Range Prediction (LRP) of channel estimation in HSDPA and text proposal", Wiscom, 15–19 Jan. 2001, rather it is a method for eliminating insignificant channel taps which are historically of small amplitude in relation to accuracy. Faced by an unknown channel which could be the Vehicular-B IU channel of up to 85 taps in duration with six active reflections in unknown locations or the Ped-B ITU channel of only 1.6 chips duration, the long term variance estimation can reduce the channel model to a small number of taps in either case and reduce the aggregate channel estimate error variance several-fold relative to a model with a large number of taps.

Figure 11:
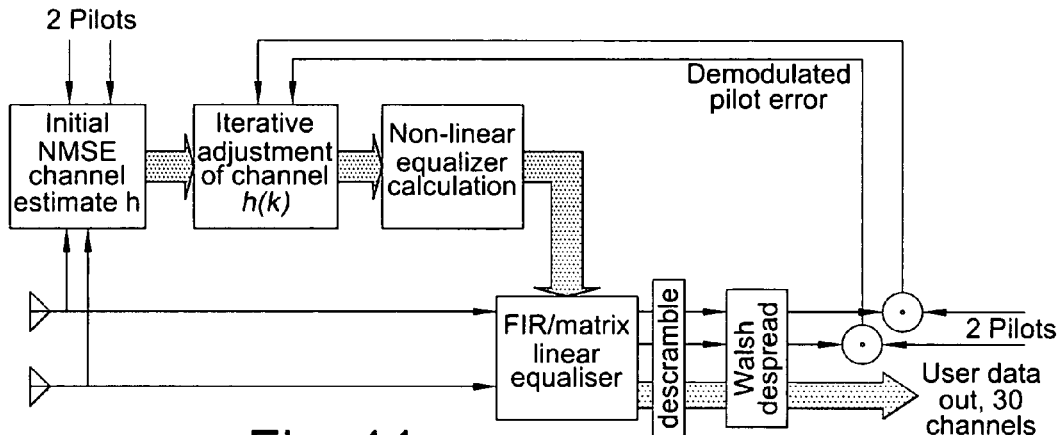
FIG. 11 is a schematic block diagram showing iteration of a Fourier domain solution to minimise pilot estimate MSE.

With reference to FIG. 11 a further improvement (on an estimation produced using one of or a combination of the techniques described above, or of another channel estimation technique) is now described.

As explained above, the use of orthogonal pilot codes in m transmit antennas is insufficient to completely differentiate their transmissions at the receiver in a dispersive channel but the problem is substantially solved by the use of m-fold multiple versions of the training sequences giving a determinate algebraic solution for the m channel impulse responses to each receiver element. However, in the presence of user data on the transmissions further improvements on that technique can be achieved since the data superimposed on the pilot signals is also deorthogonalized in a dispersive channel and the data noise makes the channel estimates noisy. The data is unknown at the receiver so it is not possible to write out equations to remove was done for the pilots/training sequences in the technique above.

For the 3GPP FDD standard, the CPICH codes are modulated repetitions of the 256-chip Walsh code #0, which is all ones, while the data modulates orthogonal 16-chip Walsh codes drawn from the orthogonal variable spreading factor (OVSF) tree. Orthogonality requires that the user Walsh codes are codes other than 16-chip code #0 which is 16 ones, so there are only 15 codes available for user data.

Given this problem, iterative improvement of the channel coefficients is proposed as an effective method for improving the receiver performance to a condition very close to optimum.

The goal for optimising the channel coefficients in a dispersive channel is to achieve zero cross coupling of the demodulated user-data and pilot symbols and a good equivalent metric is the mean square error of the demodulated pilot symbols. The basic system is shown in FIG. 11 which shows a system for iteration of a Fourier domain solution by minimising mean square error (MSE) of the received pilots against a local 'ideal' copy as explained below.

The instinctive implementation demands a large DSP load since the Fourier transforms have to be redone at every iteration. High DSP load is undesirable. To optimise the receiver it is has been found to be sufficient to optimise reception of the pilots by demodulating them and minimising the mean square error of their associated "symbols". The "pilot error" signal could be at the chip level or after despreading by a factor of 16 to match the data.

Let the summed mean square (MS) error $\theta$ of the two pilots symbol sequences at the receiver be functionally dependent on the estimated channel impulse responses by a function of the form $\theta(\underline{h})$ where h is the vector of Channel Impulse Responses (ChIR) for MN channels (M transmit antenna elements and N receive antenna elements). The function $\theta(\underline{h})$ is not known at the outset but by using the estimated channels in an earlier process such as one described above, we start out fairly close to a minimum of $\theta$. If the equalizer were a linear function of the channel coefficients then the MS error at the output would be a quadratic function of h having the general form $$\theta(h) = (h - h_{OPT})^H M (h - h_{OPT}) + c$$

where c is the minimum error, M is a matrix representing cross coupling between the channel components, h contains all channel impulse responses stacked vertically into a single vector and $h_{OPT}$ is the optimum channel estimate.

Figure 12:
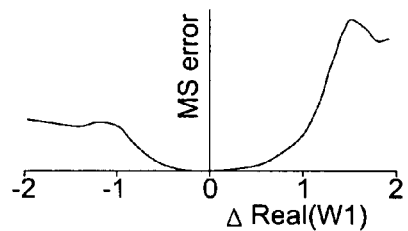
FIG. 12 is a plot of the functional relation between a channel tap value and MS filter error.

The equaliser derived from h is actually close to a channel whitener so its frequency spectrum approximates a reciprocal of the spectrum of h. Therefore $\theta$ is not actually quadratic function of h as suggested above. An example for a six-tap channel is shown in FIG. 12

Figure 13:
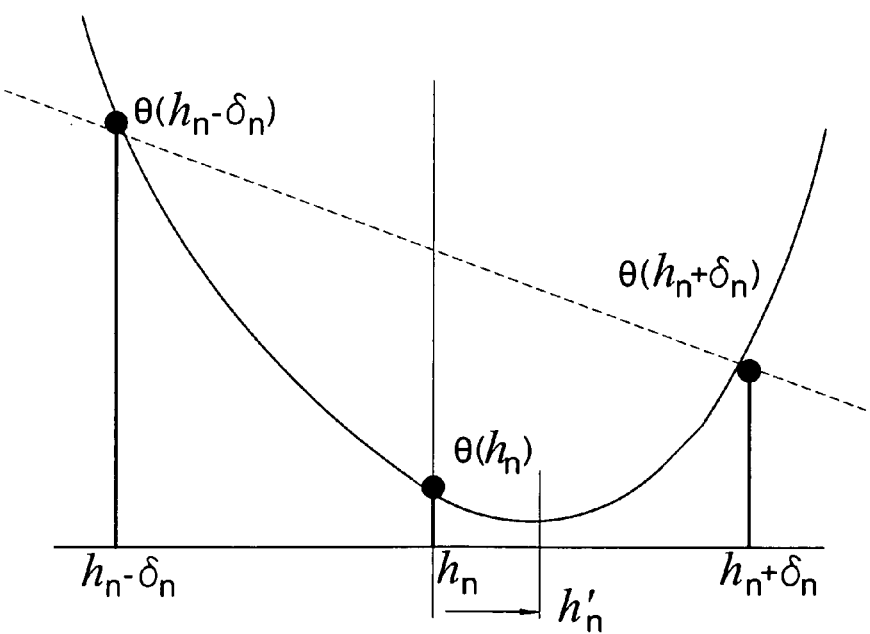
FIG. 13 is a plot of variation in MS error via a single channel coefficient.

General methods for exploring non-linear responses are known, however, for small perturbations about the optimum $h_{OPT}$ it appears that the quadratic equation above is a good approximation to $\theta(\underline{h})$. The simulations have minimised $\theta(\underline{L})$ by symmetric perturbations of the vector h. It has been found to be sufficient to do this element by element as there is little coupling between taps. For MN physical channels each with a K-tap impulse response, the number of variables is 2KMN, treating the in-phase and quadrature elements of h as independent variables, thus we have this many variables to optimise. The minimum for the $n^{th}$ element $h_n$ is found by perturbing of $h_n$ by $\pm\delta$ and fitting a parabolic function to the three values of $\theta$ as shown in FIG. 13.

$$h + \delta_n = \begin{bmatrix} h_0 \\ h_1 \\ h_2 + \delta_2 \\ \vdots \\ h_{N-1} \end{bmatrix}$$

We can write $\theta = ax^2 + bx + c$ on this line with $\delta = 1$ and we have $$d_2 = \theta(x_n + \delta_n) - 2\theta(x_n) + \theta(x_n - \delta_n) = 2a$$

$$d_1 = \theta(x_n + \delta_n) - \theta(x_n - \delta_n) = 2b$$

$$c = \theta(x_n)$$

and the minimum of the parabola lies at $$x'_n = x_n - \delta \frac{d_1}{2d_2}.$$

Thus after measuring the error at the three points the associated channel impulse response element is reset to $x'_n$ before moving to the next element.

Figure 14:
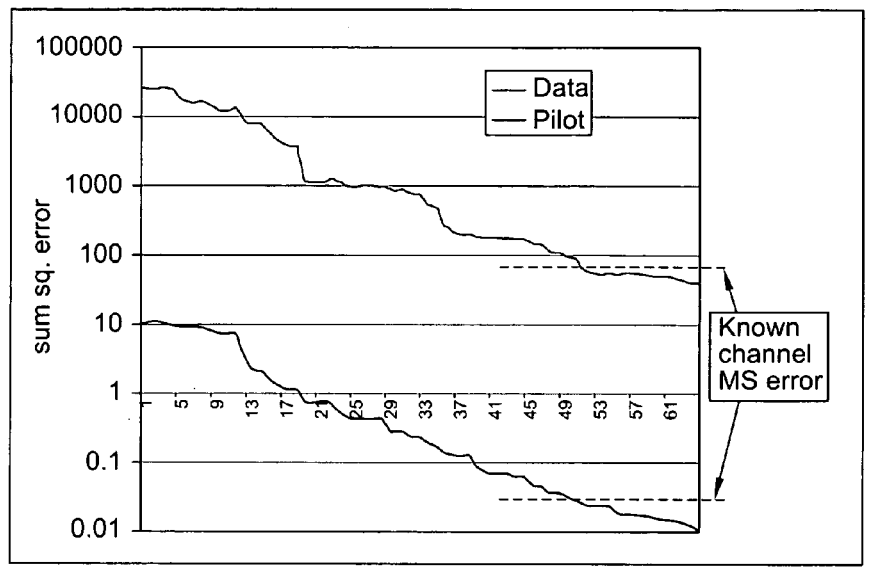
FIG. 14 is a plot showing iterative improvement of a 2:2 MIMO channel equaliser in accordance with the invention.

FIG. 14 shows the iterative improvement of the equalizer for an exemplary 2×2 MIMO channel. The four physical channels each have two tap channel impulse responses with coefficients drawn independently from a complex Gaussian distribution. The data uses BPSK modulation in a block of 1024 samples and the system is noise-free. There are 16 real-valued channel coefficients (=8 complex numbers) which describe the channel and these have been optimised in turn in 4 cycles.

Figure 15:
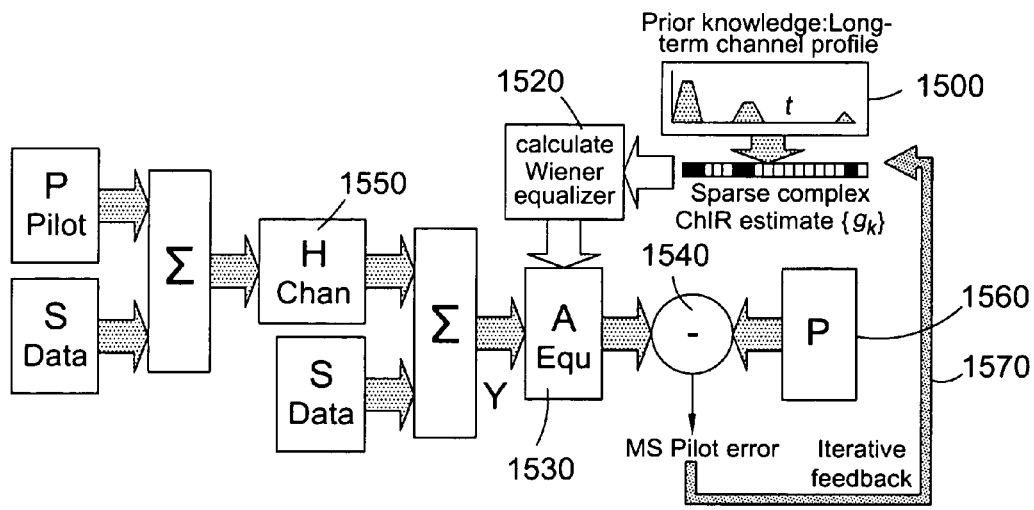
FIG. 15 is a schematic block diagram of a Fourier domain channel equaliser optimisation.

The iterative channel adjustment of the last section is formalized in FIG. 15 which shows the long-term or a-prion channel power-delay profile (PDP) 1500, a sparse complex channel impulse response estimate ĝ, 1510, generation of a frequency domain Wiener equaliser from ĝ$_k$ 1520, equalization of the channel in the frequency domain 1530 and measurement of the mean square difference θ 1540 between the equalized pilot signal from the channel 1550 and the local reference 1560. A feedback loop 1570 from the latter is used to optimise ĝ$_k$ by minimizing θ.

Note that as the equalizer is improved in this iterative method, so the orthogonality between the data and pilot signals is progressively restored and the "user data noise" superimposed on the pilots at a relative level of +10 dB, which dominates the channel estimation noise in a dispersive channel, starts to decrease and finally becomes insignificant. The general method easily extends to finding MIMO channel FFT equalizers and this was done for the 2:2 channel results of FIG. 14 where there was a >1000-fold improvement in MS accuracy during adaptation from an initial least-squares channel estimate.

The long term power-time profile (PDP) of the channel can use information from a number of sources. Firstly there is knowledge of the maximum time delay likely in a given channel, secondly there are ChIR estimates done with a simplified estimator possible direct correlation, thirdly old ChIR estimates from previous slots and fourthly the ACF of the composite signal, which includes the data part, can be analysed to get a ChIR. The ACF is an added result from all the TX antennas but it is expected that in a typical MIMO situation the locations of multipaths will be very similar in all the channels and the composite TX multipaths will give good prior information.

It should be understood that reference to a base station refers to serving infrastructure irrespective of the form of air-interface adopted by the exemplary CDMA-based architecture of the preferred embodiment. In other words, the term base station should be construed broadly and, where necessary, to include references to communication relay devices or even mobile stations. While the main applications are in channel estimation on a downlink for CDMA and OFDM in order to apply coherent soft hand-off and interference cancellation in locations where two or more base stations are at similar ranges and the weaker base stations, if ignored, cause mutual interference, the preferred embodiments are not intended to be limiting to these specific arrangements.

We claim:

1. A method of determining channel impulse responses of a plurality of channels to a communication device, the method comprising:
    performing transform operations on both a replica of a signal sequence s$_n$ and a received training sequence y$_n$ received by the communication device in at least one burst, the received training sequence y$_n$ being the signal sequence as received through a channel, the transform operations arranged to generate a multiplicity of signal sequence frequency bins and a multiplicity of training sequence frequency bins;
    performing point-by-point operations between corresponding signal sequence frequency bins and training sequence frequency bins; and
    concatenating the point-by-point operations associated with the channel to provide a composite frequency response for the channel, the composite frequency response allowing, in the time domain, generation of a channel impulse response H for the channel; wherein multiple Steiner codes are transmitted as training sequences, the multiple Steiner codes sent from multiple transmit elements in multiple training bursts.

2. The method according to claim 1, further comprising:
    separating training sequence bursts emanating from a single element transmitter by one of a cyclic prefix and a blank (zero) carrier.

3. The method according to claim 1, wherein the multiple Steiner codes are transmitted from multiple elements of a base station transmit antenna.

4. The method according to claim 1, further comprising using a set of matrix operations in the frequency domain to resolve channels to the communication device from multiple transmitting stations, the matrix operations providing solvable linear equations for the channel impulse response H and the signal sequence expressible in a matrix-vector form at each frequency bin in terms of the received training sequence.

5. The method according to claim 4, further comprising solving the linear equations using a minimum mean square error (MMSE) estimation technique.

6. The method according to claim 5, wherein the MMSE estimation technique employs a Weiner filtering operation providing:

$$\hat{H} = (S^H S + Cov(B))^{-1} S^H Y$$

where: Cov(B) is a covariance matrix of thermal noise;
    $S^H Y$ is a matched filter operation arranged to minimize the signal to noise ratio but not to remove mutual interference between channel estimates; and $(S^H S+Cov(B))^{-1}$ is a decoupling matrix that removes the coupling between different channels caused by any non-ideal nature of the training sequences.

7. The method according to claim 2, wherein the number of bursts sent to the communication device from each transmitting unit in communication contact therewith is calculated as a multiplication of:
   a number of transmitting elements in a transmit array of a transmitting unit; and
   a number of transmitting units in communication contact with the communication device.

8. The method according to claim 7, wherein training sequence burst between transmitting units are time-aligned.

9. A method of determining channel impulse responses of channels incident to a communication device, the method comprising:
   transmitting multiple quasi-orthogonal pseudo-noise sequences as bursts from multiple base stations each having at least one transmit element, successive bursts providing an extended training sequence for use in channel estimation at the communication device; and
   applying a Wiener frequency domain MMSE deconvolution with frequency domain spatial decoupling matrices to generate channel impulse response estimates for the channels: wherein the quasi-orthogonal pseudo-noise sequences are Steiner codes.

10. The method according to claim 9, further comprising allocating only a single training sequence to each base station, the single training sequence being of sufficient length to encompass all multiple time-translated channel impulse responses.

11. A method of determining channel impulse responses of a plurality of channels established between a plurality of transmitting elements and a communication device in a communication system, the method comprising:
   substantially simultaneously transmitting different training bursts from each of the plurality of transmitting elements, each burst having a length at least as long as a maximum channel duration in the communication system multiplied by a number corresponding to the plurality of transmitting elements;
   recovering at the communication device a signal sequence $S_n$ from the different training bursts $Y_n$; and
   resolving the plurality of channels to recover associated channel impulse responses H for each channel by solving an algebraic matrix operation expressed in matrix-vector form as Y=SH, where: S is a matrix of partial training bursts for each channel, each training burst segmented into N pieces in the time domain; Y is a vector of a received signal sequence; and H is a concatenation of different channel impulse response vectors; wherein multiple Steiner codes are transmitted as training sequences, the multiple Steiner codes sent from multiple transmit elements in multiple training bursts.

12. A computer program product residing in a computer readable medium and for a processor within a receiver device, the computer program product comprising:
   code that performs transform operations an both a replica of a signal sequence $s_n$ and a received training sequence $y_n$ received by a communication device in at least one burst, the received training sequence $y_n$ being one of multiple Steiner codes, the multiple Steiner codes sent from multiple transmit elements in multiple training bursts and being the signal sequence as received through a channel, the transform operations arranged to generate a multiplicity of signal sequence frequency bins and a multiplicity of training sequence frequency bins;
   code that performs paint-by-point operations between corresponding signal sequence frequency bins and training sequence frequency bins; and
   code that concatenates the point-by-point operations associated with the channel to provide a composite frequency response for the channel, the composite frequency response allowing, in the time domain, generation of the channel impulse response for the channel.

13. A communication device having a receiver coupled, in use, to receive a plurality of channels supporting a signal sequence $s_n$ and training sequence $y_n$ bursts, the communication device having:
   a signal processing platform to perform transform operations on both a replica of a signal sequence $s_n$ and a received training sequence $y_n$ received by the communication device in at least one burst, the received training sequence $y_n$ being the signal sequence as received through a channel, the transform operations arranged to generate a multiplicity of signal sequence frequency bins and a multiplicity of training sequence frequency bins;
   the signal processing platform arranged to perform point-by-point operations between corresponding signal sequence frequency bins and training sequence frequency bins; and
   the signal processing platform further arranged to concatenate the point-by-point operations associated with the channel to provide a composite frequency response for the channel, the composite frequency response allowing, in the time domain, generation of a channel impulse response for the channel; whereby multiple Steiner codes are transmitted as the training sequences, the multiple Steiner codes sent to the receiver through multiple channels in multiple training bursts.

14. The communication device according to claim 13, wherein the signal processing platform operates to establish a set of matrix operations in the frequency domain to resolve channels to the communication device from multiple transmitting stations, the matrix operations providing solvable linear equations for the channel impulse response and the training sequence expressible in a matrix-vector form at each frequency bin.

15. The communication device according to claim 14, wherein the signal processing platform solves the linear equations using a minimum mean square error (MMSE) estimation technique.

16. The communication device according to claim 14, wherein the MMSE estimation technique employs a Weiner filtering operation providing:

$$\hat{H}=(S^H S+Cov(B))^{-1} S^H Y$$

where: Cov(B) is a covariance matrix of thermal noise;
   $S^H Y$ is a matched filter operation arranged to maximise the signal to noise ratio but not to remove mutual interference between channel estimates; and
   $(S^H S+Cov(B))^{-1}$ is a decoupling matrix that removes the coupling between different channels caused by any non-ideal nature of the training sequences.

17. A communication receiver comprising:
   means for receiving, in use, multiple quasi-orthogonal pseudo-noise sequences as bursts from multiple base stations each having at least one transmit element, successive bursts providing an extended training sequence for use in channel estimation at the communication receiver; and means for applying a Wiener frequency domain MMSE deconvolution with frequency domain spatial decoupling matrices to generate channel impulse response estimates for the channels; wherein the quasi-orthogonal pseudo-noise sequences are Steiner codes.

18. A communication device operational to receive a plurality of training sequences on a plurality of channels and a signal sequence $S_n$, the communication device comprising:

a receiver for substantially simultaneously receiving, in use, different training bursts from each of the plurality of channels emanating from a plurality of transmit elements, each burst having a length at least as long as a maximum channel duration multiplied by a number corresponding to the plurality of transmit elements;

recovery circuitry for recovering, in use, the signal sequence $S_n$ from the different training bursts $Y_n$; and a processor arranged to resolve the plurality of channels to recover associated channel impulse responses H for each channel by solving an algebraic matrix operation expressed in matrix-vector form as Y=SH, where: S is a matrix of partial training bursts for each channel, each training burst segmented into N pieces in the time domain; Y is a vector of a received signal sequence; and H is a concatenation of different channel impulse response vectors; wherein multiple Steiner codes are transmitted as training bursts, the multiple Steiner codes sent from multiple transmit elements in multiple training bursts.

19. A base station of a communication system, the base station comprising:

a transmitter chain arranged to transmit multiple quasi-orthogonal pseudo-noise sequences as training bursts $Y_n$ from at least one transmit element and further arranged to transmit a signal sequence $S_n$, successive training bursts providing an extended training sequence for use in channel estimation at a communication device of the communication system, the transmitter chain substantially simultaneously transmitting, in use, different training bursts from each of the at least one transmit element, each training burst having a length at least as long as a maximum channel duration in the communication system multiplied by a number corresponding to a plurality of channels to the communication device, the extended training sequence and the signal sequence $S_n$ providing a resolution mechanism to the communication device allowing the communication device to resolving the plurality of channels to recover associated channel impulse responses H for each channel by solving an algebraic matrix operation expressed in matrix-vector form as Y=SH, where: S is a matrix of partial training bursts for each channel, each training burst segmented into N pieces in the time domain; Y is a vector of a received signal sequence; and H is a concatenation of different channel impulse response vectors; multiple Steiner codes are transmitted as training bursts, the multiple Steiner codes sent from multiple transmit elements in multiple training bursts.

20. The base station of claim 19, wherein the transmitter chain is further arranged to separate training bursts emanating from the at least one transmit element by one of a cyclic prefix and a blank (zero) carrier.

21. The base station of claim 19, wherein the number of training bursts sent to the communication device from each base station in communication contact therewith is calculated as a multiplication of:

a number of transmitting elements in a transmit array of a base station; and a number of base stations in communication contact with the communication device.

22. A method of estimating a channel impulse response comprising:

(a) receiving a signal including a training sequence of predetermined training symbols, (b) passing the received signal through a channel equaliser to substantially remove distortion of the signal caused by transmission over a channel, (c) demodulating at least one of the training symbols, (d) calculating a non quadratic, non linear error metric of the demodulated training symbol against a locally stored record of a known correct value of the demodulated training symbol (a) adjusting the estimated channel impulse response to substantially minimise a mean square error, and (f) feeding the adjusted estimated channel impulse response back to the channel equaliser for use in subsequent equalisation operations;

whereby channel estimates used in the channel equaliser are iteratively refined; and multiple transmissions are received over a plurality of channels each including a training sequence and wherein a summed mean square error of all training sequences is minimised by adjusting the estimated channel response h for each tap of each channel impulse response in turn according to the equation $$\theta(h) = (h - h_{OPT})^H M (h - h_{OPT}) + c$$

where h is a vector of channel impulse responses for all channels, $h_{OPT}$ is an optimum channel impulse response, M is a matrix representing cross-coupling between channel components and a is the minimum error.

23. A method according to claim 22, wherein the training symbol error metric is calculated as a mean square error.

24. A method according to claim 22, wherein the received signal is a CDMA signal and wherein the training sequence is despread using at least one different spreading factor to recover training sequence bits or sub-bits.

25. A method according to claim 22, wherein multiple transmissions are received over a plurality of channels each including a training sequence and wherein the summed mean square error of all training sequences is minimised by adjusting the estimated channel response h using a technique selected from gradient descent methods, search methods, and direct solution algorithms.

26. A method according to claim 22, wherein $\theta$ (h) is minimised by calculating $\theta(h)$ and $\theta(h \pm \delta)$ where $\pm \delta$ is a relatively small symmetric perturbation about h, fitting a curve to three points generated thereby and finding the minimum of a fitted curve in terms of h.

27. A method according to claim 22 wherein the channel equaliser is a Wiener (MMSE) equaliser.

28. A method according to claim 22, wherein a first estimate of the channel impulse response is generated by:

performing transform operations on both a replica of a signal sequence $s_n$ and a received training sequence $y_n$ received by the communication device in at least one burst, the received training sequence $y_n$ being the signal sequence as received through a channel, the transform operations arranged to generate a multiplicity of signal sequence frequency bins and a multiplicity of training sequence frequency bins;

performing point-by-point operations between corresponding signal sequence frequency bins and training sequence frequency bins; and concatenating the point-by-point operations associated with the channel to provide a composite frequency response for the channel, the composite frequency response allowing, in the time domain, generation of a first estimate of the channel impulse response for the channel.

29. A method according to claim 22, wherein the estimated impulse response is further refined by obtaining a long-term averaged power delay profile for the channel, setting a predetermined variance threshold, estimating a channel impulse response having a plurality of taps, and removing taps from the channel impulse response estimate equivalent to those which in the long-term averaged power delay profile, have a variance below the predetermined variance threshold.

30. A method according to claim 29 wherein the predetermined variance threshold is a power threshold.

31. A method according to claim 29 wherein the predetermined variance threshold is an accuracy threshold.

32. A method of estimating a channel impulse response comprising:
(a) obtaining a long-term averaged power delay profile for the channel,
(b) setting a predetermined variance threshold,
(c) estimating a channel impulse response having a plurality of taps, and
d) removing taps from the channel impulse response estimate equivalent to those which in the long-term averaged power delay profile, have a variance below the predetermined variance thresholds;
wherein the channel impulse response estimate is combined with an accuracy of the channel impulse response estimate as predicted point-by-point from a combined power delay profile end interference level, whereby a modified short term, channel estimate is produced in which points likely to have poor accuracy are deweighted and those likely to have good accuracy are retained such that a final equalise performance is optimised.

33. A method according to claim 32, wherein the predetermined variance threshold is dependent on the level of interference in the channel.

34. A method according to claim 32, wherein the long term power delay profile is obtained based on knowledge of a likely maximum time delay in any given channel.

35. A method according to claim 32, wherein the long term power delay profile is obtained using a simple estimate of the channel impulse response.

36. A method according to claim 32, wherein the long term power delay profile is obtained from historical channel impulse responses for the channel.

37. A method according to claim 32, wherein the long term power delay profile is obtained by deriving a channel impulse response from an autocorrelation function of the received signal.

38. A method according to claim 32, wherein the modified short term channel estimate is produced using a Bayesian method.

39. A method according to claim 32, wherein the channel impulse response $\hat{H}$ is estimated according to the equation $$\hat{H}_{MMSE} = Diag\left(\frac{\lambda + \rho_k}{\lambda \rho_k}\right)^{-1} Diag\left(\frac{\lambda + \sigma^2}{\lambda \sigma^2}\right) \hat{H}_1$$

$$= Diag\left(\frac{\rho_k}{\sigma^2} \cdot \frac{\lambda + \sigma^2}{\lambda + \rho_k}\right) \hat{H}_1$$

where $\rho_k$ is a long-term standard deviation of each channel estimate tap which provides a long-term power delay profile for the channel, $\lambda$ is the estimation standard deviation of a least squares estimator, and $\sigma$ is the standard deviation of thermal noise in the channel.

40. A method of estimating a channel impulse response comprising:
(a) taking long-term measurements to build a database of where in time, multipath interference is located in the channel to generate an incoherent power delay profile for the channel, and
(b) modelling a relatively short term channel impulse response by allocating variable complex amplitudes and phases to taps at locations in the short term model which have the multipath interference in the incoherent power delay profile which is above a predetermined threshold.

41. A method according to claim 40, wherein the channel impulse response having a plurality of taps is estimated by performing transform operations on both a replica of a signal sequence $s_n$ and a received training sequence $y_n$ received by the communication device in at least one burst, the received training sequence $y_n$ being the signal sequence as received through a channel, the transform operations arranged to generate a multiplicity of signal sequence frequency bins and a multiplicity of training sequence frequency bins;
performing point-by-point operations between corresponding signal sequence frequency bins and training sequence frequency bins; and
concatenating the point-by-point operations associated with the channel to provide a composite frequency response for the channel, the composite frequency response allowing, in the time domain, generation of the channel impulse response for the channel.

42. A method according to claim 41 wherein the channel impulse response estimates are refined by receiving a signal including a training sequence of predetermined training symbols, passing the received signal through a channel equaliser to substantially remove distortion of the signal caused by transmission over a channel, demodulating at least one of the training symbols, calculating the mean square error of the demodulated training symbol against a locally stored record of a known correct value of the demodulated training symbol, adjusting the estimated channel impulse response to substantially minimise the mean square error, and feeding the adjusted estimated channel impulse response back to the channel equaliser for use in subsequent equalisation operations whereby the channel estimates used in the channel equaliser are iteratively refined.

43. A computer program product residing in a computer readable medium which when executed by a computer causes the computer to carry out the steps of:
(a) receiving a signal including a training sequence of predetermined training symbols, (b) passing the received signal through a channel equaliser to substantially remove distortion of the signal caused by transmission over a channel, (c) demodulating at least one of the training symbols, (d) calculating a non quadratic, non linear error metric of the demodulated training symbol against a locally stored record of a known correct value of the demodulated training symbol, (e) adjusting an estimated channel impulse response to substantially minimise the mean square error, and (f) feeding the adjusted estimated channel impulse response back to the channel equaliser for use in subsequent equalisation operations whereby channel estimates used in the channel equaliser are iteratively refined; and wherein multiple transmissions are received over a plurality of channels each including a training sequence and wherein a summed mean square error of all training sequences is minimised by adjusting the estimated channel response h for each tap of each channel impulse response in turn according to the equation $$\theta(h)=(h-h_{OPT})^H M(h-h_{OPT})+c$$

where h is the vector of channel impulse responses for all channels, $h_{OPT}$ is the optimum channel impulse response, M is a matrix representing cross-coupling between channel components and c is the minimum error.

44. A product according to claim 43, wherein the training symbol error metric is calculated as a mean square error.

45. A product according to claim 43 including discarding channel estimate taps which have poor accuracy as predicted from a channel power delay profile.

46. A computer program product residing in a computer readable medium which when executed by a computer causes the computer to carry out the steps of:
(a) obtaining a long-term averaged power delay profile for the channel,
(b) setting a predetermined variance threshold,
(c) estimating a channel impulse response having a plurality of taps, and
(d) removing taps from the channel impulse response estimate equivalent to those which in the long-term averaged power delay profile, have a variance below the predetermined variance threshold; wherein the channel impulse response estimate is combined with the accuracy of the channel impulse response as predicted point-by-point from the combined power delay profile and interference level, whereby a modified short tern channel estimate is produced in which points likely to have poor accuracy are deweighted and those likely to have good accuracy are retained such that final equalise performance is optimised.

47. A product according to claim 46 including iterative adjustment of the channel estimates to minimise a mean square error on at least one training symbol.

48. A communications receiver arranged to receive signals from a plurality of sources and arranged to estimate a channel impulse response for a channel between the receiver and each source by:
(a) receiving a signal including a training sequence of predetermined training symbols,
(b) passing the received signal through a channel equaliser to substantially remove distortion of the signal caused by transmission over a channel,
(c) demodulating at least one of the training symbols,
(d) calculating a non quadratic, non linear error metric of the demodulated training symbol against a locally stored record of its known correct value,
(e) adjusting an estimated channel impulse response to substantially minimise the mean square error, and
(f) feeding the adjusted estimated channel impulse response back to the channel equaliser for use in subsequent equalisation operations;

whereby the channel estimates used in the channel equaliser are iteratively refined; and multiple transmissions are received over a plurality of channels each including a training sequence and wherein a summed mean square error of all training sequences is minimised by adjusting the estimated channel response h for each tap of each channel impulse response in turn according to the equation $$\theta(h)=(h-h_{OPT})^H M(h-h_{OPT})+c$$

where h is a vector of channel impulse responses for all channels, $h_{OPT}$ is an optimum channel impulse response, M is a matrix representing cross-coupling between channel components and c is the minimum error.

49. A receiver according to claim 48 including discarding channel estimate taps which have poor accuracy as predicted from a channel power delay profile.

50. A receiver according to claim 48, wherein the training symbol error metric is calculated as a mean square error.

51. A communications receiver arranged to receive signals from a plurality of sources and arranged to estimate a channel impulse response for the channel between the receiver and each source by:
(a) obtaining a long-term averaged power delay profile for the channel,
(b) setting a predetermined variance threshold,
(c) estimating a channel impulse response having a plurality of taps, and
(d) removing taps from the channel impulse response estimate equivalent to those which in the long-term averaged power delay profile, have a variance below the predetermined variance threshold;

wherein the channel impulse response estimate is combined with the accuracy of the channel impulse response as predicted point-by-point from a combined power delay profile and interference level, whereby a modified short term channel estimate is produced in which points likely to have poor accuracy are deweighted and those likely to have good accuracy are retained such that final equalise performance is optimised.

52. A receiver according to claim 51 including iterative adjustment of the channel estimates to minimise the mean square error on at least one training symbol.

* * * * *